(12) United States Patent
Powell

(10) Patent No.: US 8,725,786 B2
(45) Date of Patent: May 13, 2014

(54) APPROXIMATE SRT DIVISION METHOD

(75) Inventor: Makia Powell, Raynham, MA (US)

(73) Assignee: University of Massachusetts, Boston, MA (US)

( * ) Notice: Subject to any disclaimer, the term of this patent is extended or adjusted under 35 U.S.C. 154(b) by 883 days.

(21) Appl. No.: 12/770,197

(22) Filed: Apr. 29, 2010

(65) Prior Publication Data

US 2010/0281087 A1 Nov. 4, 2010

Related U.S. Application Data

(60) Provisional application No. 61/214,888, filed on Apr. 29, 2009.

(51) Int. Cl.
*G06F 7/44* (2006.01)
*G06F 7/52* (2006.01)

(52) U.S. Cl.
USPC ............ 708/504; 708/650; 708/651; 708/653

(58) Field of Classification Search
USPC ......................................... 708/504, 650–656
See application file for complete search history.

(56) References Cited

U.S. PATENT DOCUMENTS

| | | | | |
|---|---|---|---|---|
| 5,046,038 | A | * | 9/1991 | Briggs et al. ................... 708/654 |
| 5,140,179 | A | * | 8/1992 | Takano ........................ 327/203 |
| 5,307,303 | A | * | 4/1994 | Briggs et al. ................... 708/654 |
| 5,475,630 | A | * | 12/1995 | Briggs et al. ................... 708/654 |
| 6,594,681 | B1 | * | 7/2003 | Prabhu .......................... 708/504 |
| 8,255,448 | B1 | * | 8/2012 | Langhammer ................. 708/653 |
| 2003/0050950 | A1 | * | 3/2003 | Agami et al. .................. 708/650 |
| 2004/0186873 | A1 | * | 9/2004 | Tang et al. ..................... 708/650 |
| 2009/0006509 | A1 | * | 1/2009 | Amin et al. .................... 708/200 |
| 2012/0166512 | A1 | * | 6/2012 | Wong et al. .................... 708/650 |

OTHER PUBLICATIONS

M. D. Ercegovac, T. Lang and P. Montuschi, "Very high radix division with prescaling and selection by rounding," IEEE Transactions on Computers, vol. 43, No. 8, pp. 909-918, Aug. 1994.*
A. A. Ibrahem, H. Elsimary, and A. E. Salama, "FPGA implementation of modified radix 2 SRT division algorithm," 2003 IEEE 46th Midwest Symposium on Circuits and Systems, vol. 3, pp. 1419-1422, Dec. 2003.*
D. L. Fowler and J. E. Smith, "An accurate high speed implementation of division by reciprocal approximation," in Proc. 9th IEEE Symp. Comput. Arithmetic, 1989, pp. 60-67.*

(Continued)

*Primary Examiner* — Chat Do
*Assistant Examiner* — Matthew Sandifer
(74) *Attorney, Agent, or Firm* — Milstein Zhang & Wu LLC; Joseph B. Milstein

(57) ABSTRACT

The invention relates to a program storage device readable by a machine, tangibly embodying a program of instructions executable by a specific semiconductor-based computational device situated in the machine to perform the steps of a partial SRT (PSRT) division of a dividend X by a divisor D to obtain a quotient Q. The steps include: causing a computer to obtain the dividend X and the divisor D; representing the dividend X and the divisor D as a digital representation having a plurality of bits; and performing iteratively a series of steps until a desired accuracy of the quotient Q is achieved. The invention also relates to an article of manufacture including a computer usable medium having computer readable program code embodied therein for causing a partial SRT (PSRT) division of a dividend X by a divisor D to generate a quotient Q.

18 Claims, 17 Drawing Sheets

(56) References Cited

OTHER PUBLICATIONS

D. DasSarma and D. Matula, "Measuring the Accuracy of ROM Reciprocal Tables," IEEE Trans. Computers, vol. 43, No. 8, pp. 932-940, Aug. 1994.*

D. Das Sarma and D.W. Matula, "Faithful Bipartite ROM Reciprocal Tables", Technical Report, Computer Science Department, Southern Methodist University, May 1995.*

D.L. Harris, S.F. Oberman, and M.A. Horowitz, "SRT Division Architectures and Implementations," Proc. 13th IEEE Symp. Computer Arithmetic, Jul. 1997.*

T. E. Williams and M. Horowitz, "SRT Division Diagrams and Their Usage in Designing Custom Integrated Circuits for Division," Technical Report: CSL-TR-87-328, Nov. 1986.*

Stuart F. Oberman and Michael J. Flynn, "An Analysis of Division Algorithms and Implementations," Technical Report: CSL-TR-95-675, Jul. 1995.*

Pan, Kay, Chun, and Wey, "High-radix SRT division with speculation of quotient digits," Proc. International Conference of Computer Design (ICCD), Austin, Texas, 1995, pp. 479-482.*

H. Suzuki, H.Makino, K.Mashiko, and H. Hamano, "A floating-point divider using redundant binary circuits and an asynchronous clock scheme," in Proc. International Conf. Computer Design (ICCD), pp. 685-689, Oct. 1997.*

S. Upadhyay and J.E. Stine, "Pipelining high-radix SRT division algorithms," 50th Midwest Symposium on Circuits and Systems, pp. 309-312, Aug. 2007.*

\* cited by examiner

| β | α | $N_P$ | $N_D$ | $N_q$ | ROM (bits) | PLA $n_p$ | PLA Area |
|---|---|---|---|---|---|---|---|
| 4 | 2 | 5 | 3 | 2 | 0.5K | 19 | 342 |
| 8 | 4 | 8 | 6 | 3 | 48K | 302 | 9,362 |
| 16 | 8 | 10 | 8 | 4 | 1M | 2,526 | 101,040 |
| 32 | 16 | 12 | 10 | 4 | 16M | 20,698 | 999,504 |

APPROXIMATE SRT DIVISION METHOD

CROSS-REFERENCE TO RELATED APPLICATIONS

This application claims priority to and the benefit of co-pending U.S. provisional patent application Ser. No. 61/214,888, filed Apr. 29, 2009, which application is incorporated herein by reference in its entirety.

FIELD OF THE INVENTION

The invention relates in general to a computer SRT division system and method and more particularly to a computer SRT division system and method using a new approach for approximation.

BACKGROUND OF THE INVENTION

Floating point division systems and methods continue to be of interest in the art of computer processor design. Without floating point division, even the most capable current computer processors could typically take 8 to 32 times more time to perform a routine division operation. Using less powerful modern processors, that time could increase as much as one thousand times.

The Sweeny, Robinson and Tocher (SRT) floating point division method is widely used today to perform floating point division in commercial processors, including microprocessors. The SRT method is relatively easy to implement and can calculate more than one digit of the answer for each computation cycle. However, to achieve greater speeds using existing SRT methods, the size of a SRT component, the Quotient Selection Table (QST), needs to increase exponentially. Thus, according to the present art, an increase in SRT speed also leads to an exponential increase in the need for memory.

What is needed therefore, is a more efficient SRT system and method that can yield increased floating point divisions speeds.

SUMMARY OF THE INVENTION

In one aspect, the invention relates to a program storage device readable by a machine, tangibly embodying a program of instructions executable by a specific semiconductor-based computational device situated in the machine to perform the method steps of a partial SRT (PSRT) division of a dividend X by a divisor D to obtain a quotient Q. The method steps include: causing a computer to obtain the dividend X and the divisor D; representing the dividend X and the divisor D as a digital representation having a plurality of bits; and performing iteratively the following steps until a desired accuracy of the quotient Q is achieved: entering the divisor into a partial quotient select table (PQST) table, the PQST table configured to output an inverse of the divisor 1/X' to n+3 most significant digits, wherein n equals $\log_b R$, b equals a number of the base system, and R equals a Radix; multiplying the 1/X' by a selected one P' selected from: 1) on a first iteration: X, and 2) on a successive iteration: a partial remainder P from a previous cycle to compute as output a Q'; truncating the Q' to n most significant bits to yield a quotient Q''; multiplying Q'' by the divisor D and subtracting the resultant Q''D from P' (P'−Q''D) to compute the partial remainder P; shifting the partial remainder P and the quotient Q by n digits; and comparing the most recent Q'' to a previously computed Q'' to determine whether the desired accuracy has been achieved: in the event that the desired accuracy has been achieved, performing a selected step of recording, outputting and displaying the quotient Q in a digital form; and in the event that the desired accuracy has not been achieved, performing the steps identified above as iterative steps again until the desired accuracy has been achieved and a selected step of recording, outputting and displaying the quotient Q in a digital form is performed.

In one embodiment, the step of entering the divisor into a partial quotient select table (PQST) table includes entering the divisor into a partial quotient select table (PQST) table having about $2^{n+3}$ entries.

In another embodiment, at least one calculation of one of the method steps is performed using a synchronous hardware logic element.

In yet another embodiment, at least one of the synchronous hardware logic elements is clocked on a positive edge of a clock and at least one of the synchronous hardware logic elements is clocked on a negative edge of the clock.

In yet another embodiment, at least one of the synchronous hardware logic elements is clocked on both a positive edge of a clock a negative edge of the clock.

In yet another embodiment, at least one of the synchronous hardware logic elements is configured to provide the partial remainder on a clock edge of a first slope so that as the partial remainder is available to calculate a next quotient bit on a successive clock edge complimentary to the first slope.

In yet another embodiment, at least one calculation of one of the method steps is performed using an asynchronous hardware logic element.

In yet another embodiment, a two stage asynchronous divider multiplies 1/X by the partial remainder.

In yet another embodiment, the method steps are performed using a linear convergence algorithm.

In yet another embodiment, the linear convergence algorithm converges a digit precision of the quotient to a predetermined number of bits.

In yet another embodiment, the step of entering the divisor into a partial quotient select table (PQST) table includes entering the divisor into a partial quotient select table (PQST) having entries of size n+3 bits and a following step of multiplying uses a n+3-bit multiplier.

In yet another embodiment, the divisor complies with the IEEE-754r standard.

In yet another embodiment, the semiconductor-based computational device is an FPGA (field programmable logic array).

In yet another embodiment, the semiconductor-based computational device is a microprocessor.

In yet another embodiment, the PQST is disposed in a look up table on the microprocessor.

In yet another embodiment, the PQST is calculated by software and stored on memory accessible by the microprocessor.

In yet another embodiment, the PQST is calculated according to the following equation: $PQST[j]=b^{n+2}/a$ for $a=b^{n+3}$ to $b^{n+4}-1$, and $j=a-b^{n+3}$.

In another aspect, the invention relates to an article of manufacture including: a computer usable medium having computer readable program code embodied therein for causing a partial SRT (PSRT) division of a dividend X by a divisor D to generate a quotient Q, the computer readable program code in the article of manufacture including: computer readable program code for causing a computer to obtain the dividend X and the divisor D and to represent the dividend X and the divisor D as a digital representation having a plurality of bits; and computer readable program code configured to cause a computer to iteratively perform the following calculations until a desired accuracy of the quotient Q is achieved: computer readable program code configured to cause a computer to obtain the dividend X and the divisor D, and to enter the divisor D into a partial quotient select table (PQST), the PQST configured to output an inverse 1/X' of the divisor to n+3 digits, wherein n equals $\log_b R$, b equals a number of the base system, and R equals a Radix; computer readable program code configured to cause the 1/X' to be multiplied by a selected one P' of: 1) on a first iteration: X, and 2) on a successive iteration: a partial remainder P from a previous iteration to compute as output a Q'; computer readable program code configured to cause the Q' to be truncated to n most significant bits to yield a quotient Q''; computer readable program code configured to cause the quotient Q'' to be multiplied by the divisor to produce a partial product Q''D; computer readable program code configured to cause the partial product Q''D to be subtracted from P' (P'−Q''D) to compute the partial remainder P; computer readable program code configured to cause the partial remainder P and the quotient Q'' to be shifted by n digits; and comparing the most recent Q'' to a previously computed Q'' to determine whether the desired accuracy has been achieved: in the event that the desired accuracy has been achieved, performing a selected step of recording, outputting and displaying the quotient Q in a digital form; and in the event that the desired accuracy has not been achieved, performing the steps identified above as iterative steps again until the desired accuracy has been achieved and a selected step of recording, outputting and displaying the quotient Q in a digital form is performed.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 1 shows Pan's table of SRT QST size in terms of ROM size and PLA area.

FIG. 21 shows an exemplary Modelsim® wave window.

FIG. 22 shows a screenshot of a Modelsim® simulation illustrating an average case.

FIG. 23 shows a screenshot of a Modelsim® simulation illustrating a worst-case scenario.

FIG. 24 shows a screenshot of a Modelsim® simulation illustrating what occurs when the dividend and divisor are equal.

DETAILED DESCRIPTION OF THE INVENTION

Figure 2:
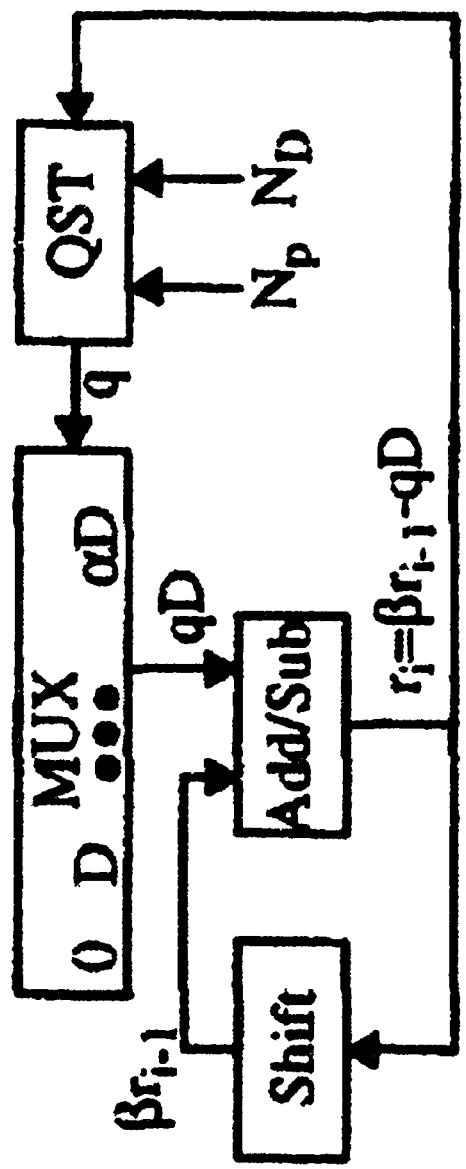
FIG. 2 shows the results of an exemplary simulation for a Radix-64 approximate SRT Divider having a multiplier stage.

This detailed description is presented in six parts. Part I presents a brief overview of SRT methods including an introduction to the inventive SRT system and method, the partial SRT or "PSRT". Part II describes division algorithms in more detail. Part III explains the SRT division method in more detail. Part IV describes a theoretical analysis (proofs) and error bounds for the inventive PSRT system and method, part V describes the PSRT system and method in further detail including architectural approaches for implementation, and part VI describes exemplary PSRT Test Results and Comparisons.

As was noted in the background, division by SRT methods and other methods is well known in the art. The inventive PSRT method described in parts IV and V of the detailed description discloses a new method that has several beneficial attributes. However, while perhaps not benefiting from the several beneficial attributes of the PSRT method, other pre-existing means to accomplish floating point division, including a wide variety of SRT methods, remain available to those not choosing to use the new PSRT method. It is thus emphasized that there are presently numerous ways to accomplish floating point multiplication and division using well known computer circuits and programmed computers. The present invention is a system for performing improved computation using specific hardware and software operating thereon, that provides advantages in terms of cost, speed and improved operation.

Part I: Introduction to SRT Methods and the Inventive SRT Method

One problem with existing SRT methods is that in order to divide much faster, or to get more digits of the answer at a time, the size of the Quotient Table "increases un-manageably." (Pan, et. al., "High-Radix SRT Division with Speculation of Quotient Digits", Proceedings of the 1995 International Conference on Computer Design: VLSI in Computers and Processors table of contents, Page 479, IEEE Computer Society, Washington, D.C.). For example, in the table of FIG. 1, it can be seen that the size of the QST increases from ½ kB for 2 digits at a time (Radix-4), to 16 MB for 5 digits at a time, an exponential rate of increase. Pan's table of FIG. 1 shows how the exponential size rate increases as the Radix, or effective bits computed at a time increases ($B=2^n$ where n=the number bits computed at a time). In the table of FIG. 1, β is the Radix, a is the number of digits at a time, $N_p$ is the number of bits of the partial remainder, $N_D$ is the number of bits of the divisor, $N_q$ is the number of bits of the quotient, ROM (read only memory) bits is the size of the QST, and PLA (programmable logic array) $n_p$ is the number of product lines, in the PLA Area. Where the QST increases exponentially in size as in the SRT method of FIG. 1, increasing, the speed of division can be problematic in both embedded systems and modern processors.

One way to reduce the size of the Quotient Selection Table (QST) is to use fewer bits. Since most methods use convergence to approximate, the QST often needs many extra bits in the dividend/divisor field known as a redundant-digit representation. For example, 10/9 might read 1.11100101. Both the dividend and divisor often need more bits in their representation since the SRT divider must "anticipate" how the quotient may be rounded. Instead of 10 and 9, we might also have 10.83 and 9.57 in the QST to help with rounding. Convergence does not yield results that are exact. Using the convergence method, the percentage error is bounded by a certain degree. (Kapur, et. al., "Mechanizing verification of arithmetic circuits: SRT division. In FSTTCS", Volume 1346 of LNCS, pg. 103-122, 1997). Therefore, convergence alone fails to significantly reduce the size of this QST table.

The recent availability of built-in multipliers in many Field Programmable Gate Array (FPGA) technologies is one reason for a renewed interest in multiplicative division algorithms. While division is a rather slow operation, multiplicative algorithms offer the benefits of lower delay, usually at the expense of increased area.

The inventive apparatus and method described herein offers the benefits of low latency, but not at the expense of increased area. Instead, it uses a combination of linear convergence and reciprocal methods to significantly reduce hardware complexity for high radix division. For example, in a Radix-64 implementation of an asynchronous 16-bit floating-point unit, the method uses only 201 Look Up Tables (LUTs) with built-in multipliers, and 410 LUTs without built-in multipliers. The new PSRT system and method was tested using a low-end FPGA hardware configuration that costs, about $30 running an exemplary algorithm. One exemplary embodiment was found to have a worst-case delay of under 38 ns, and a peak power consumption of only 60 mW. Such results are relatively fast by today's standards, especially given that a current 32-bit fixed-point divider typically has an end-to-end delay of 169 ns and needs at least 1690 LUTs. (Sorokin, "Implementation of high-Speed Fixed-Point Dividers on FPGA", Journal of Computer Science and Technology, Vol. 6 No. 1, pgs. 8-11, April 1996).

The new SRT system and method, the partial SRT (PSRT) system and method using a new approach for approximation, is described herein. As described and proven below, if two numbers are known out to their first N digits, then the first N-2 digits of their product or division can also be known. This statement allows an assumption that the dividend is always 1, and thus a multiplier can be used to multiply the quotient from the QST to get the correct quotient.

EXAMPLE 1

Consider two numbers a=123.450 and b=456.780, and their product, a*b=56389.491. We want to know the product of c=123.456 and d=456.780 or c*d. Since we know that the most significant five digits of a and b are equal to c and d respectively, we can assume the first three digits of a*b are equal to c*d, or that c*d=563XX.XXX. The product of c*d is 56392.231680.

The algorithm used in the new system and method lets us speculatively round up, and correct later. The rounding is relatively simple because the algorithm can round up only in a certain decimal place. If the result is incorrect (i.e. the new trial dividend is negative), then the divisor is shifted and added back to the new trial dividend before the next stage. Thus the QST can be reduced from a table with $4(2^{N*2})$ entries, to only $2^{N+3}$ entries, an exponential difference (an exponential reduction in the size of the QST).

In addition, the algorithm used in the new system and method can also reduce the number of bits in the QST (reducing the size of the QST), and the only added cost is a low-order multiplier, usually 10 bits or less. The additional delay for the multiplier is very low, and the QST size can be reduced from 16 MB, to under 3 kB (2.56 kB), a factor of reduction of over 6000. Pan's relatively sophisticated hardware in "High-Radix SRT Division with Speculation of Quotient Digits" reduced a QST table to 22 kB. For the same Radix, the inventive PSRT system and method uses a 2.56 kB QST, a QST more than 7 times smaller than is needed in Pan's design. As the number of bits increases, a PSRT implementation becomes much smaller compared to both existing and theoretical SRT implementations since the QST size does not increase exponentially. Thus, the approximation algorithm used in the PSRT system and method greatly simplifies the approximations used in SRT, resulting in a much smaller chip size (area) and potentially much greater speeds because of the ability to compute more digits of the answer at a time.

Simulations

Exemplary feasibility tests were performed using a hardware simulator. The simulation was performed for a Radix-64 approximate SRT Divider having a multiplier stage using Taiwan Semiconductor Manufacturing Company ("TSMC") 0.35 μm technology. TSMC also provides as mainstream technology 0.25 μm, 0.22 μm, 0.18 μm and 0.15 μm technology, and as advanced technology 0.45 nm, 0.55 nm, 0.65 μm and 0.90 μm technology. FIG. 2 shows the results of the simulation. Using dated technology (0.35 micron), the extra delay from the multiplier is low. It is further contemplated that by using more recent technology (65 nm), the speed will improve significantly. Using various sizes, the additional delays ranged from 5.6-10 ns, for Radix-64 (6 bits) to Radix-1024 (11 bits).

This issue of QST exponential increase has previously limited the speed of SRT. For example, until recently, Pentium processors manufactured by the Intel Corporation computed only 2 digits at a time, before computing three digits of the answer at a time. By contrast, the QST can be 1000 or more times smaller than prior art QSTs by using the inventive PSRT system and method since it uses a different approximation scheme. Because an algorithm used in the inventive system and method knows the relative error in digits, as a digit-by-digit algorithm, it has a simpler implementation than existing convergence-based schemes, and thus results in a smaller chip size (smaller area). The improved SRT (PSRT) design can be used to improve the speed of current processors. The PSRT design can also be used in embedded systems applications including cryptography because of its ability to produce more digits of the solution while using less physical chip (integrated circuit) area.

Thus, it can be seen that the approximation algorithm used in the PSRT system and method results in a much smaller QST. While in the prior art, as the divider processes more bits at a time, the QST table increases exponentially, using the new PSRT approximation algorithm, the size of the QST increases linearly, providing an exponentially smaller QST. Since the size of the QST is a main factor in cost and speed, the new technology can potentially greatly reduce the cost, and improve the speed of SRT division. Prior art (SRT) is currently used in many commercial processors ranging from Intel, to embedded systems. Currently the speed is limited to the number of bits which can be processed at a time, usually, 2-3 bits at a time. By contrast, PSRT technology can be used to implement high-speed division with relatively low area. Also, it is contemplated that cryptographic communications protocols could benefit from a technology which can process 10 or more bits at a time, due to bit encoding and communication rates.

Part II: Division Algorithms and Linear Convergence Algorithms

There are currently several classes of division algorithms each with their own advantages and disadvantages. There are two main categories of division algorithms: quadratic convergence and linear convergence algorithms. Both classes of algorithms have a function that is repeated to yield the quotient. Since the function is recursive, current literature, including Sorokin, refers to each repetition of the function as an iteration. The algorithm used in the PSRT system and method described herein is a linear convergence algorithm.

Quadratic convergence algorithms double the amount of quotient digits calculated for each iteration. Current literature typically refers to each quotient digit calculated as a retired digit. The algorithms start from an approximation of the divisor's reciprocal, and repeat a recursive function that equals zero when the divisor is accurate to a given precision. Then, the divisor's reciprocal is multiplied by the dividend to yield the quotient. (Oberman, et. al., "Division Algorithms and Implementations", IEEE Transactions on Computer, vol. C-46, pgs. 833-854, 1997).

Two commonly used quadratic convergence algorithms are the Newton-Rhapson, and Goldschmidt's algorithm. The Newton-Rhapson algorithm uses Newton's method. Newton's method is based upon the equation $D*1/D-1=0$; where D is the divisor. Therefore, if $X_0$ is the initial divisor, the function of Eq. 1 (the Newton-Rhapson method) is repeated until $F(X)=0$.

$$X_{i+1}=X_i-(F(X_i)/F'(X_i)) \qquad \text{Eq. (1)}$$

where $F(X_i)=X_i*1/X_{i-1}$.

Goldschmidt's algorithm is similar to Newton-Rhapson, but it uses a series expansion. Instead of finding the divisor reciprocal, both the dividend and divisor are multiplied by a scaling factor until the divisor converges to 1, and the dividend converges to the quotient.

There are several pros and cons regarding quadratic convergence methods. For example, while quadratic convergence algorithms compute the quotient relatively fast, they require many multiplications. Usually, the additional multipliers require additional hardware. In addition, the precision of the quotient is not exact, since the algorithms use convergence and the final result is correct only within a certain range. Typically such algorithms are modified so that this error is within 1 Unit in the Last Place (ULP), also known in the art as "1 ULP." Therefore many designs that use quadratic convergence algorithms add extra error correction hardware to detect if the quotient's error is out of bounds, and then to correct the quotient.

Linear convergence algorithms calculate the quotient one digit at a time. The number of bits calculated at a time is directly proportional to the Radix. The higher the Radix, the more bits of the quotient the algorithm calculates per iteration. The relationship between the Radix, R, and number of bits per digit is:

$$R=2^r \qquad \text{Eq. (2)}$$

In Eq. 2, r is the number of bits per digit for Radix-R. For example, for Radix-64, R is 64, and since $64=2^6$, we know that r=6, and that the divider will calculate 6 bits of the quotient each iteration.

There are two types of linear convergence algorithms: restoring and non-restoring. In both cases, the general formula for division can be shown as the SRT Equation:

$$P_{j+1}=rP_j-Q_{j+1}*d \qquad \text{Eq. (3)}$$

where $P_{j+1}$ is the next partial remainder, $P_j$ is the current partial remainder, r is the number of bits in the Radix, $Q_j$ is the current quotient digit, and d is the divisor. The first Partial Remainder, $P_0$, is the dividend, and the final quotient, Q, is the sum of all $Q_j$.

During each iteration, the divisor is multiplied by the quotient digit, and subtracted from the partial remainder. Before subtraction, the partial remainder is shifted left by r bits (i.e. one digit), where r is the number of bits in the Radix. (Harris, et. al., "SRT division architectures and implementations", Proceedings of the 13th IEEE Symposium on Computer Arithmetic, July 1997, pgs. 18-25). This process is repeated N times, where N is the length of the dividend, divided by the length of the Radix in bits. For example, a 32-bit divider using Radix-256 division would take 32/8=4 iterations. Often times, the quotient digit is estimated, so the next partial remainder may be negative. For example, in base 10, Radix 10, if the dividend is 120, the divisor is 13, and the quotient digit is I then the first partial remainder would be 120-(10*13)=-10. In restoring division, the divisor is added back to the partial remainder, and the quotient, $Q_j$ is decreased by one. So for the restoring case, 10*13 would be added back to -10 to yield 120. In non-restoring division, the next partial remainder remains negative, but in the next iteration, the quotient digit, $Q_{j+1}$ will also be negative. Allowing the quotient digit to take negative values instead adds the product of the quotient digit and divisor to the partial reminder, $P_j$. As a result, the final quotient $Q_j$ is positive. (Fenwick, "High-Radix Division with Approximate Quotient Digit Estimation", Journal of Universal Computer Science, vol. 1, no. 1, pgs 2-22, January 1995). In the example above, if the first partial remainder is -10, then in the next iteration, $rP_j=-100$, and $Q_{j+1}=-8$. So the final partial remainder would be calculated as $-100-(13*-8)=4$, which is the remainder of 100 divided by 13. The final quotient, Q, is the sum of all quotient digits in their respective places. In this non restoring case Q=10+-0.8=9. Notice that Q was rounded down to the nearest integer, and that the second partial remainder -8 was shifted right by one since quotient digits are added in their respective places.

The most popular linear convergence division algorithm used today is the SRT method, developed it in the 1950s and named after its three inventors Sweeney, Robertson and Tocher. The SRT method is non-restoring, and uses a Quotient Selection Table (QST) to select each quotient digit based upon both the dividend and divisor. During each iteration, the dividend is the Partial Remainder, $P_j$, the divisor is d, and the quotient digit is $Q_j$.

Although SRT is relatively fast when compared to other linear convergence methods, the size of the QST grows quadratically as the Radix increases. The QST expands exponentially since it is dependent upon both the dividend and divisor. Often, SRT measures only the first few bits of the dividend and divisor, usually $\log_2 R$ bits for Radix-R. However, for Radix-R (e.g. for Radix-64, R=64, r=6 where $r=\log_2 R$), this results in a table with $R^2$ entries (4,096 for R=64). In addition, each entry must have a certain number of bits for the quotient digit for accuracy. Knuth shows that for Radix-4, we at least need r+2 bits of the quotient, where r=2; the number of bits in the Radix.

Part III: SRT Implementations

The basic SRT algorithm (Eq. 3) was described above in Part I. Several implementations and improvements to the basic SRT method are now described. At the most basic level, SRT resembles long division, using an arbitrary base, an arbitrary radix, and an arbitrary number of bits, rather than base 10 standard division that we learned in school as children. At the beginning of each iteration, the quotient digit is selected from the QST. The QST is typically implemented on a read only memory (ROM), or as a Look-Up-Table (LUT). After the quotient digit is selected, it is used to select the quotient-divisor product $Q_j{}^*d$ using a multiplexer. Next, the quotient-divisor product is subtracted from the partial remainder using an adder. The process is then repeated until the partial remainder is less than the divisor.

Figure 3:
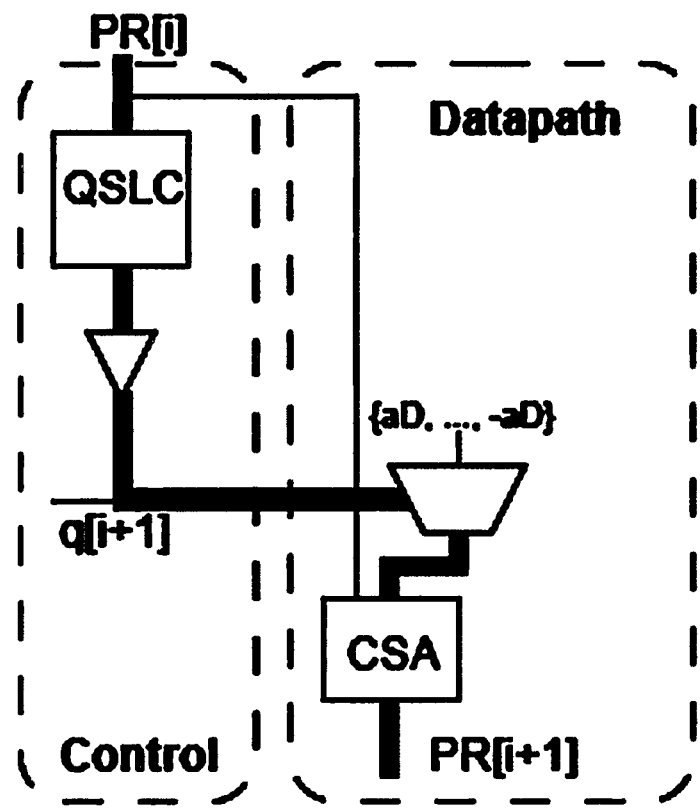
FIG. 3 shows one exemplary SRT architecture.

The block diagram of a basic SRT divider of FIG. 3 shows one exemplary SRT architecture. In FIG. 3, the quotient select logic ("QLSC") is the QST, and the quotient digit, q[i+1] is used to select the next partial remainder, PR[i+1], using a multiplexer. This figure uses redundant digit notation. If the maximum value for Q Radix-R is $\alpha$, then the multiplexer can select any multiple of the divisor, D, from $-\alpha D$ to $\alpha D$ to subtract from the partial remainder PR[i] to form the next partial remainder, PR[i+1].

For example, if the divided is 1024 base 2, and the divisor is 544 base 2, then using Radix-4 division, the maximum value of Q Radix-4 is 2. Since the maximum value for Radix-4 is 2, a=2, and since the divisor is 544, D=544. Depending upon the quotient digit, the multiplexer can select any value from −2*544 to 2*544 to subtract from the partial remainder PR[i]. Assuming this is the first iteration, the partial remainder PR[0] is the dividend, 1024, the first quotient digit, q[1] is 1. Therefore, using the multiplexer pictured in FIG. 3, subtract 544*1 from 1024 to yield the next partial remainder PR[1], which equals 1024−544*1=480.

Over the years, designers have made improvements to SRT that make it faster, and more efficient. For example, one improvement on the basic SRT method uses pre-scaling of the dividend and divisor. To reduce the size of the QST, many designs pre-scale both the dividend and divisor to a certain range. Usually, the range for the dividend is 1<P<2, and the divisor's range is 0.5<D<1. Pre-scaling can be done using a priority encoder and a left shifter. The priority encoder and shifter left shift the dividend to the leftmost position, and shift the divisor to the next to leftmost position. (Ercegovac, et. al., "Very high Radix division with selection by rounding and prescaling", IEEE Transactions on Computers, vol. 43, pgs. 909-918, August 1994). For example, assume that the operand width is 4 bits, and that using this system, 2 is 1000, and 1 is 0100, and ½ is 0010 in binary. If the dividend is 0010, the divisor is 0011, and the width of the operands is 4 bits, then the dividend would be shifted to 0100, and the divisor will remain at 0011. Afterwards, the result is right shifted by the difference of the number of positions the dividend was shifted, and the number of positions the divisor was shifted. In the previous example, the quotient will be shifted by 1−0=1 position.

Left shifting both the dividend and divisor decreases the size of the QST significantly since the quotient entries in the QST are the same precision. With left shifting, the quotient can have a range of only 2≤Q<4, numbers that have the same binary length. In addition, since the leftmost bit of the dividend and divisor are always '1', the leftmost bits can be omitted from the QST. However, omitting the leftmost '1' from the QST adds extra delay since the most significant '1' of the quotient is added back later.

Another improvement on the basic SRT method uses redundant digit representation. If the SRT divider uses full-width carry-propagate adders, the SRT divider has a high latency when the product of the divisor and quotient is subtracted from the dividend. Redundant digit notation reduces this delay by allowing the divider to use carry save adders instead, reducing the delay caused by carry propagation. Redundant digit notation uses signed 2's complement numbers, and contains more bits than required in Radix-R. For example, a Radix-4 redundant digit notation would contain at least 3 bits of the quotient. Because of the added precision, the quotient can be approximated, reducing the size of the QST.

There are two types of redundant digit notation. For Radix-R, where $R=2^r$:
1) A maximally redundant digit set contains $\{-(R-1), -(R-2) \ldots 0 \ldots (R-2), (R-1)\}$.
2) A minimally redundant digit set contains $\{-(R/2-1), -(R/2-2) \ldots 0 \ldots (R/2-2), (R^{/2}-1)\}$ where all digits in the set are in signed-2's complement form.

Harris et al. show that using a maximally redundant digit set in Radix-4 division is 20% faster, and 50% smaller than a minimally redundant digit set at the expense of additional delay and area of the QST.

Another improvement on the basic SRT method uses Quotient Digit Speculation. In 1995, Pan et al. published a study which shows how the size of the QST increases with Radix. ("High-Radix SRT division with speculation of quotient digits", Proceedings of IEEE International Conference on Computer Design: VLSI in Computers and Processors, pages 479-484, October 1995). Table 1 shows the results from the studies for radices 8-32:

TABLE 1

| Radix | Size of ROM (in bits) |
|---|---|
| 4 | 0.5K |
| 8 | 48K |
| 16 | 1 M |
| 32 | 16 M |

In the study, the authors split the QST into two smaller tables called the RQST and QHT that estimated the quotient digit, and then corrected the prediction if the quotient digit was incorrect. Table 2 shows the results from the studies for Radix 8-32 using combined RQST and QHT Size:

TABLE 2

| Radix | Size of ROM (in bits) |
|---|---|
| 8 | 0.5K |
| 16 | 4K |
| 32 | 22K |

Pan showed that the max error bound from approximating the quotient is −1. So, while the quotient is calculated, the correction hardware runs in parallel. Then, before retiring the quotient digit, a multiplexer is used to select between the speculated quotient Q, and the corrected quotient, Q+1. Although the size of the QST in the study decreased, its size still increases quadratically with Radix.

Figure 4:
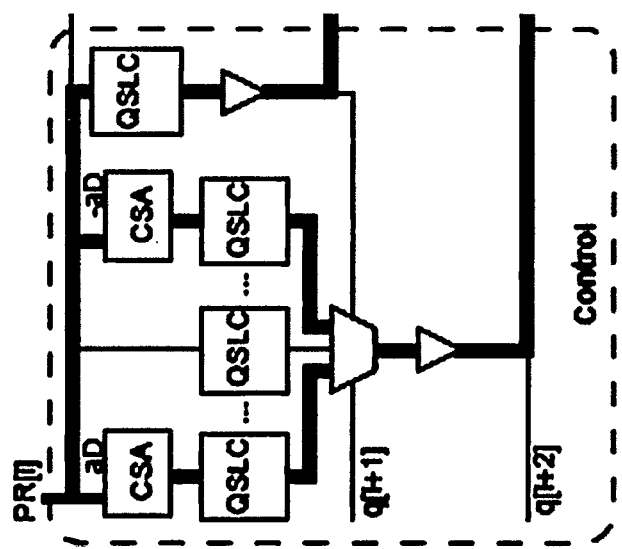
FIG. 4 shows a block diagram of an overlapped QST architecture.

Another improvement on the basic SRT method uses quotient overlapping. Some designs speculate the quotient, then select the correct quotient based upon the partial remainder, Pj. This approach decreases delay at the expense of area since the QST must return more than one entry. Returning more than one entry requires either duplicating the QST, or enlarging the QST so that it returns more than one entry. FIG. 4 from Harris shows a block diagram of an overlapped QST architecture.

Figure 5:
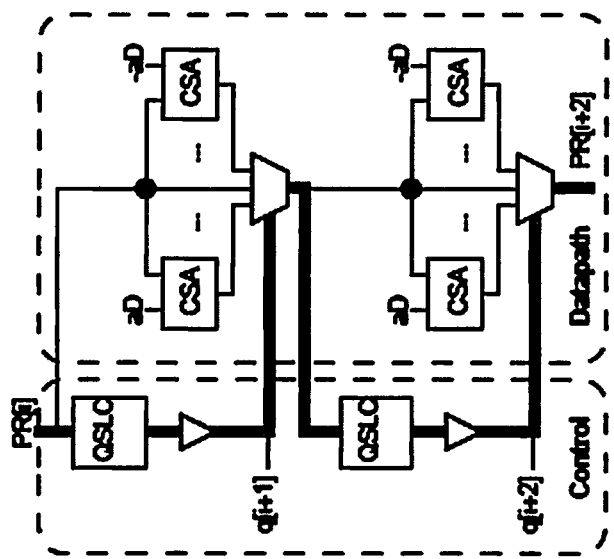
FIG. 5 shows a block diagram of overlapped Partial remainder selection architecture.

Another improvement on the basic SRT method uses partial remainder overlapping. Some designs speculate the partial remainder, then select the correct partial remainder based upon the quotient digit, Qj. All of the possible partial remainders are computed, then a multiplexer is used to select the correct partial remainder. This saves critical path delay at the expense of added hardware due to computation of all possible partial remainders. FIG. 5 from Harris shows a block diagram of an architecture using overlapped partial remainder selection. Yet another improvement on the basic SRT method uses hybrid overlapping. A combination of quotient digit speculation, quotient overlapping and partial remainder overlapping can further reduce the latency of SRT computations.

All of the SRT methods and improvements discussed above make trade-offs between area and latency. Duplicating the QST would cause an increase in area (where area can be defined in terms of units) as is done in quotient overlapping. Also, for example, while a redundant digit set can decrease delay (since the SRT divider can use carry save adders) it increases the area of the QST. And, while speculation of the quotient and partial remainder reduce critical path delay, speculation of the quotient and partial remainder requires additional error correction hardware for the quotient digit. In addition, the size of the QST in bytes still increases quadratically with Radix. Since increased area and components usually leads to increased power consumption using VLSI and FPGA technologies, power is also an issue with existing SRT designs.

By contrast, the inventive improved SRT system and method and associated algorithms as presented below and herein, improve both the speed and area of SRT by using different estimation logic. Instead of approximating with respect to the divisor or dividend, the algorithm approximates with respect to the number of bits in the Radix. Knowing the exact quotient reduces hardware complexity since the algorithm does not need as much of the correction hardware as required in other linear convergence and quadratic convergence algorithms. Instead, the algorithm increases the quotient digit precision so that it is correct to a certain number of bits. Furthermore, the size of the QST decreases by a factor of at least r, where r is the number of bits in the Radix. So instead of a table with $(2^r)^2$ entries, the QST has only $2^{r+3}$ entries, and a small r+3-bit multiplier.

Part IV: PSRT Theoretical Analysis

Since most approximation algorithms estimate error with respect to the divisor, this description first gives a theoretical analysis for the algorithm, and shows that the error of an approximation can be stated in respect to the number of bits in the Radix, r. The algorithm used in the inventive system and method is named "Partial SRT" (PSRT) since it approximates the dividend, divisor and quotient. In the theoretical analysis which follows, a partial number refers to the leftmost n digits of a number, where n is a positive integer. After the theoretical analysis, an additional assumption is described that eliminates the need for a redundant digit set. Lastly, an implementation of a PSRT system and method, including how PSRT implementation differs from SRT, is described.

Theorem 1: The Leftmost Equality Theorem

Theorem 1, the Leftmost Equality Theorem (LET), is a new theorem. LET differs from the byte division approximation since it gives the error in digits, instead of as a percentage, or fraction of the dividend or divisor. LET states that if the leftmost n digits of two numbers are known, then we at least know the leftmost n-2 bits of the product. In Radix-R, which has r bits per quotient digit, PSRT uses LET to approximate the reciprocal of the divisor to r+3 bits, and then multiplies the divisor's reciprocal by the first r+3 bits of the dividend to yield the quotient digit. The resulting quotient digit has at least r correct digits which is the Radix width. After each iteration, the PSRT method shifts the partial quotient left by exactly r bits with no need for correction cycles since the quotient has at least r bits that are correct.

The second theorem, Theorem 2, modifies the partial quotient so that the estimated quotient is always less than or equal to the actual quotient. Then, the second theorem shows that the max error of the quotient is equivalent to the error in the LET. Therefore, the estimated quotient for Radix R is still correct to r bits. Both theorems can be proved as follows below.

Beginning with Theorem 1, the Leftmost Equality Theorem (LET) is proven as follows:

Statement:

If we know the leftmost n digits of two numbers, at least the leftmost n-2 digits of the product are known.

Proof:

First, the dividend and divisor reciprocal are written in a sum of products form, also known as digit decomposition. Each digit pre-multiplies the base, b, raised to some power. Now, each number is split into left and right parts.

Let:

$$P = P_L + P_R \qquad X = X_L + X_R$$

$$P_L = \sum_{k=S_p+L_p-n}^{S_p+L_p-1} P_k b^k \qquad X_L = \sum_{k=S_x+L_x-n}^{S_x+L_x-1} X_k b^k$$

$$P_R = \sum_{k=S_p}^{S_p+L_p-n-1} P_k b^k \qquad X_R = \sum_{k=S_x}^{S_x+L_x-n-1} X_k b^k$$

Here P is the dividend, X is the divisor's reciprocal, $S_p$ and $S_x$ are the start digit places of P and X respectively, $L_p$ and $L_x$ are the lengths of P and X in digits, and b is the base. All numbers are integers. Each $P_k$ and $X_k$ is the digit pre-multiplying the $k^{th}$ power of b, and has an absolute value strictly less than the base, b. Next, there is an estimated dividend and divisor's reciprocal P' and X'. The first n digits of P' and X' are equal to the first n digits of P and X respectively. In other words, the left parts of P' and X' are equal to the leftmost parts of P and X.

Let:

$$P' = P_L + P'_R \qquad X' = X_L + X'_R$$

$$P_L = \sum_{k=S_p+L_p-n}^{S_p+L_p-1} P_k b^k \qquad X_L = \sum_{k=S_x+L_x-n}^{S_x+L_x-1} X_k b^k$$

$$P'_R = \sum_{k=S_p}^{S_p+L_p-n-1} P'_k b^k \qquad X'_R = \sum_{k=S_x}^{S_x+L_x-n-1} X'_k b^k$$

$$P_R \neq P'_R, \quad X_R \neq X'_R$$

The quotient is the product of the dividend, and divisor reciprocal, or Q=PX, where Q is the quotient. Next, Q, and Q', the products of PX and P'X' respectively are calculated so that some comparisons can be made.

Let:

$$Q = PX = (P_L + P_R)(X_L + X_R)$$

-continued $$Q = (P_L X_L) + (P_L X_R + X_L P_R) + (P_R X_R)$$
$$\phantom{Q = }\text{Left} \qquad \text{Middle} \qquad \text{Right}$$

Likewise, $$Q' = P'X' = (P_L + P'_R)(X_L + X'_R)$$

$$Q' = (P_L X_L) + (P_L X'_R + X_L P'_R) + (P'_R X'_R)$$
$$\phantom{Q' = }\text{Left} \qquad \text{Middle} \qquad \text{Right}$$

Notice that Q, and Q' are split into left, middle, and right terms. When Q is compared to Q', the left parts are equal. However, the middle and right terms of Q' and Q differ. To determine the maximum error, first determine the worst case values for the difference between Q and Q', the estimated quotient. The worst case difference for Q and Q' occurs when the difference between each digit in the middle and right terms of P and P' and X and X' are equal to b−1 since the maximum value for each digit base b is b−1. There are two cases where the worst case occurs. In the first case, each digit in the middle and right terms of both P and X is zero, and each digit in the middle and right terms of both P' and X' is equal to b−1, where b is the base. In this case, the maximum difference is the sum of the middle and right terms of Q', the estimated quotient. In the second case, each digit in the middle and right terms is equal to—(b−1). Now, the right terms of P' and X' are simplified by substituting the worst case. In the first case where every middle and right digit in P' and X' is equal to (b−1).

$$P'_R = \sum_{k=S_p}^{S_p+L_p-n-1} (b-1)b^k \qquad X'_R = \sum_{k=S_x}^{S_x+L_x-n-1} (b-1)b^k$$

$$P'_R = \sum_{k=S_p}^{S_p+L_p-n-1} b^{k+1} - b^k \qquad X'_R = \sum_{k=S_x}^{S_x+L_x-n-1} b^{k+1} - b^k$$

$$P'_R < b^{S_p+L_p-n+1} - b^{S_p+L_p-n}, \qquad X'_R < b^{S_x+L_x-n+1} - b^{S_x+L_x-n}$$

Since, $$P'_R < b^{S_p+L_p-n+1} - b^{S_p+L_p-n}, \text{ and } X'_R < b^{S_x+L_x-n+1} - b^{S_x+L_x-n}$$

we can use $$P'_R \approx b^{S_p+L_p-n+1}, \text{ and } X'_R \approx b^{S_x+L_x-n+1}$$

to provide a max-bound to the error estimate for Q'. If the values of the max bound are substituted for the worst-case $P'_R$, and $X'_R$ into Q', then Q' is equal to:

$$Q' = P'X' = (P_L + b^{S_p+L_p-n+1})(X_L + b^{S_x+L_x-n+1})$$

$$Q' = (P_L X_L) + \begin{pmatrix} P_L b^{S_x+L_x-n+1} + \\ X_L b^{S_p+L_p-n+1} \end{pmatrix} + (b^{S_p+L_p-n+1} b^{S_x+L_x-n+1})$$
$$\phantom{Q' = }\text{Left} \qquad \text{Middle} \qquad \text{Right}$$

$$Q' =$$

$$(P_L X_L) + \left( \sum_{k=S_p+L_p-n}^{S_p+L_p-1} P_k b^k b^{S_x+L_x-n+1} + \sum_{k=S_x+L_x-n}^{S_x+L_x-1} X_k b^k b^{S_p+L_p-n+1} \right) + (b^{S_p+L_p-n+1} b^{S_x+L_x-n+1})$$
$$\phantom{Q' = }\text{Left} \qquad\qquad\qquad \text{Middle} \qquad\qquad\qquad \text{Right}$$

Knowing that, $$\sum_{k=S_p+L_p-n}^{S_p+L_p-1} P_k b^k < b^{S_p+L_p}, \text{ and } \sum_{k=S_x+L_x-n}^{S_x+L_x-1} X_k b^k < b^{S_x+L_x}$$

the maximum power of the sum of the middle and right terms is less than:

$$b^{S_p+L_p+S_x+L_x-n+1} + b^{S_p+L_p+S_x+L_x-n+1} = 2b^{S_p+L_p+S_x+L_x-n+1}$$

Therefore, the worst case for the sum of the middle and right terms of P' and X' error is strictly less than '2' in the $S_p+S_x+L_p+L_x-n+1$ place.

Next, this proof or theoretical analysis examines the worst case in terms of the number of accurate digits in the estimated quotient. The worst case occurs when the leftmost digits have a minimal product, and the middle and right terms have maximal products. Also, the worst case for the leftmost parts occurs when the product is $S_p+S_x+L_p+L_x-1$ digits long or, in other words, there is no carry when P and X are multiplied. So, the expression for the leftmost bits is:

$$P_L = \sum_{k=S_p+L_p-r}^{S_p+L_p-1} P_k b^k = b^{S_p+L_p-1} \qquad X_L = \sum_{k=S_x+L_x-r}^{S_x+L_x-1} X_k b^k = b^{S_x+L_x-1}$$

In the worst-case $P_L$ and $X_L$ are equal to $b^{S_p+L_p-1}$, and $b^{S_x+L_x-1}$ respectively since all other digits except for the leftmost digit are zero.

The product of the worst-case $P_L$ and $X_L$ is:

$$P_L X_L = b^{S_p+L_p-1} b^{S_x+L_x-1} = b^{S_p+S_x+L_p+L_x-2}$$

So, at worst, the leftmost parts have a 1 in the $S_p+S_x+L_p+L_x-2$ place.

Next, this proof or theoretical analysis compares the number of digits between the left terms of Q and Q' and the middle terms of Q, and Q' to determine how many digits are exactly known. Comparing Q and Q' yields:

$$Q-Q' < b^{S_p+S_x+L_p+L_x-2} - 2b^{S_p+L_p+S_x+L_x-n+1}$$

When the absolute number of digits between the leftmost digit of the left parts, which are equal, and the leftmost digit of the middle and right parts which are unequal are counted the total number of digits is:

$$S_p+L_p+S_x+L_x-2+1-(S_p+L_p+S_x+L_x-n+1)=n-3$$

Now, the difference between the number of digits in the leftmost and middle terms is n−3. If the leading '1' in the leftmost places of Q, and Q' is counted, the number of known digits is n−3+1=n−2 digits. So, if the number of accurate digits of Q' compared to Q is counted, the actual quotient, then there is, a difference strictly less than '−2' in the n−2$^{th}$ place from the left. The '1' was added to the leftmost place to account for the left-most '1' since in the worst case for $P_L X_L$, there is a '1' in the $b^{S_p+S_x+L_p+L_x-2}$ place.

Conversely, if instead each bit in the middle and right terms of Q is 0, and each bit in the middle and right terms of Q' is equal to −(b−1), where b is the base, then the maximum error is a difference of +1 in the n−2 place. This can be seen by simply replacing every (n−1) term in the preceding equations with a−(b−1) term. This theorem asserts that when two numbers are multiplied that at least the first n+2 digits of both numbers must be known to achieve n digits of accuracy for their product. Since the SRT divider uses binary numbers, the base, b is 2 and each digit is a bit.

Examples of Leftmost Equality:

It has been shown above, if the first n+2 leftmost digits two numbers are known, X' and P', then the first n leftmost digits of their product Q is also known.

For example, if we multiply 12399*45799 (P'=12399, X'=45799) and compare it with 12300*45700 (P'=12300, X'=45700), then their products are 12399*45699=567861801, and 12300*45700=562110000. In both cases the equal digits are highlighted in bold. In this case, since the first 3 digits of each product is equal, at least the leftmost digit of their products is equal.

In base 2, 12399*45799=567861801 is
11000001101111*1011001011100111=
100001110110001110001000101001
Also in base 2, 12300*45700=562110000 is
11000000001100401100101000100=
100001100000010001111000110000

In this case, at least the first 7 bits of P' and X' are equal (highlighted in bold), so at least the first 5 bits of their product are equal. Although there are more digits equal in this case, the theorem was proven at the worst case. These two operands, P' and X' can be operands to a multiplier, or the divisor, P' and the divided reciprocal, X' as done in the PSRT divider.

Theorem 2: Quotient Approximation

The previous proof or theoretical analysis shows that if the dividend and quotient reciprocal are known to n+2 digits then their product, the quotient, will be correct to at least n digits, ±1. If the base, b, is set to binary, then b=2, and n=r, the number of bits in the Radix. Although this information may be helpful for some implementations, implementing this estimation alone would require correcting the quotient digit since the partial remainder may be negative. Recall that from the general formula for division as shown by the SRT Equation of Eq. 3, in order for the partial remainder to be negative, the estimated quotient digit must differ from the actual quotient digit by +1. If the partial remainder is positive, then the speculated quotient digit is always less than or equal to the actual quotient digit. If the partial remainder is never negative, and the dividend and quotient reciprocal are known to r+3 bits, then the quotient digit will be known to at least r+1 bits−1. This is equal to knowing r bits−½. The extra precision eliminates the need for correcting the quotient digit prior to shifting since the partial remainder's first r bits would be zero before it is shifted left by r bits.

Statement:

Given the divisor's reciprocal, X, and dividend, P, to at least r+3 bits: the product Q''=(X'−1)(P') has the same error as the product Q'=X'P' if the dividend and divisor have the constraints 1≤X<2, and 1≤P<2. In other words, if the dividend and divisor are pre-scaled to a certain range, and one extra bit of precision is added, then the estimated quotient has a difference of at most−½.

Proof:

First round down the divisor estimate, D', to r+3 bits. This means that after the first r+3 significant bits, the rest of the divisor estimate is zero. Therefore X'≥X since D'≤D. Since the rest of X to from X' are truncated, the difference of X and X, is X−X'<1. This value which is less than '1' in the last place happens to be the same worst case difference for LET which was proven earlier. This is because assuming that numbers are in the form 1.XXXXXX, the worst case difference between X' and X is the same as the difference between 1.XXXXXX11111, and 1.XXXXXX00000, which is at worst in the form 0.00000011111. In other words, less than '1' in the last significant place of the Radix.

LET is a general approximation theorem for multiplication which can also be used for division. If it is proven that adding a '1' to the last significant divisor has the same error assumptions as LET, then LET can be used to justify truncating the divisor's reciprocal, X. Refer back to the proof or theoretical analysis for the leftmost equality theorem. A substitution was made for the sum of the middle and right terms before determining the max error for the estimated quotient digit, and the actual quotient digit.

$$b^{S_p+L_p+S_x+L_x-n+1}+b^{S_p+L_p+S_x+L_x-n+1}=2b^{S_p+L_p+S_x+L_x-n+1}$$

Given the expression for Q' in that proof or theoretical analysis, notice that each $b^{S_p+L_p+S_x+L_x-n+1}$ term is equivalent to a '1' in the n−2th place of the left term.

$$Q' = P'X' = \left(P_L + b^{S_p+L_p-n+1}\right)\left(X_L + b^{S_x+L_x-n+1}\right)$$

$$Q' = (P_L X_L) + \begin{pmatrix} P_L b^{S_x+L_x-n+1} + \\ X_L b^{S_p+L_p-n+1} \end{pmatrix} + \left(b^{S_p+L_p-n+1} b^{S_x+L_x-n+1}\right)$$

Left          Middle         Right $$Q' = (P_L X_L) + \left(\sum_{k=S_p+L_p-n}^{S_p+L_p-1} P_k b^k b^{S_x+L_x-n+1} + \sum_{k=S_x+L_x-n}^{S_x+L_x-1} X_k b^k b^{S_p+L_p-n+1}\right) + \left(b^{S_p+L_p-n+1} b^{S_x+L_x-n+1}\right)$$

Left          Middle         Right where:

$$P_L = \sum_{k=S_p+L_p-n}^{S_p+L_p-1} P_k b^k \quad X_L = \sum_{k=S_x+L_x-n}^{S_x+L_x-1} X_k b^k$$

since the left term, $P_L X_L$, begins at power $b^{S_p+L_p S_x+L_x-2n}$, and ends at the power $b^{S_p+L_p+S_x+L_x-1}$. There is a '1' in the $b^{S_p+L_p+S_x+L_x-n+1}$ place. If the number of decimal places between where the left term ends, and the $b^{S_p+L_p+S_x+L_x-n+1}$ place is counted, the total amount of terms is n−1 terms. If the leading '1' is included, there are at least n correct digits in the left term. In this case, the left term ends wherever the divisor's reciprocal, X was truncated. In this example, the left term would be 1.XXXXXX, and there would be seven digits in the left term.

Now, leave the dividend as P in the theoretical analysis, and substitute X and X' for the approximate and estimated divisor's reciprocal. Making these substitutions, then LET states that if P and X' are known to n digits, that Q', the estimated quotient digit has n−2 correct digits when compared to the actual quotient digit, Q. So, for base b=2 for binary, and n=r+3, the number of correct quotient digits is r+3−2 (r+1) correct digits in Q' when it is compared to the actual quotient digit, Q. Since the significant digits have a decimal point after the $r^{th}$ digit, r+1 precision means that at most a difference of ½ in the $r^{th}$ decimal place, which is the last significant decimal place in the Radix.

Part V: PSRT System and Method and Implementation

The PSRT system and method can cause a computer to accept a divisor and a dividend in a digital representation and to transform the divisor and dividend into a quotient that can also be recorded, provided as output and/or displayed in a digital form. The division operation according to the inventive PSRT system and method can be performed iteratively, such as by linear convergence or other suitable convergence method, until the quotient is accurate to n places. The PSRT system and method can be used for any base number system and any Radix, including, for example, the widely used base 10 and base 2 number systems. The PSRT system and method is now described in more detail.

Given the left equality theorem, and quotient approximation, the modified SRT algorithm used in the PSRT system and method can use the basic SRT represented by Eq. 3. One difference between PSRT and basic SRT, however, is that the QST contains only the difference between the divisor's reciprocal (to r+3 digits) and one, i.e. the entries X'−1. PSRT then multiplies the entry from the Partial Quotient Selection Table (PQST) by the first r+3 digits of the dividend, to yield the estimated quotient, which differs from the actual quotient by at most −½. As in SRT, the partial remainder is right shifted r digits before the next iteration. The additional multiplier is a r+3 digit multiplier. There are many ways to implement PSRT. Two exemplary implementations described below do not use specialized hardware and instead focus on the algorithm itself. The first exemplary embodiment uses one stage of a synchronous, or clocked, PSRT divider. The second exemplary embodiment unrolls divider stages to make an asynchronous PSRT divider. However, in actual practice, one would use specific hardware, for example as is illustrated hereinbelow.

Figure 6:
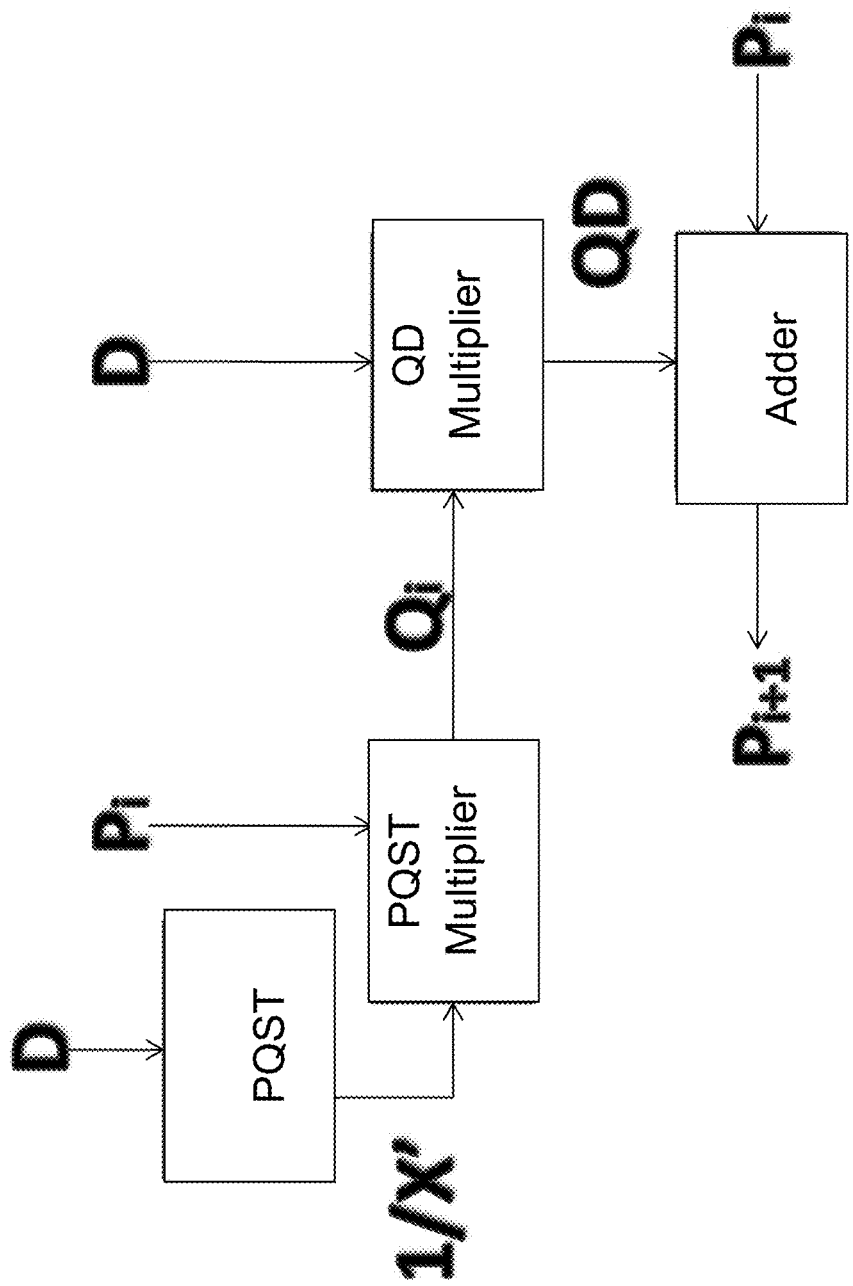
FIG. 6 shows a simplified block diagram of one exemplary embodiment of a synchronous PSRT divider.

FIG. 6 shows a simplified block diagram of the first exemplary embodiment showing one stage of a synchronous, or clocked, PSRT divider. While the diagram of FIG. 6 has some resemblance to that of FIG. 3, the multiplexer that selects the product QD in FIG. 3 has been replaced with a multiplier in FIG. 6. Although either implementation can work, the multiplier works if D has relatively few bits. Since the quotient is within 1 ULP of the real quotient, a second stage would not need to subtract QD from the partial remainder. Therefore using only one extra multiplier, a two-stage asynchronous version of the divider can multiply 1/X by the partial remainder Pi+1 to determine Q.

Figure 7:
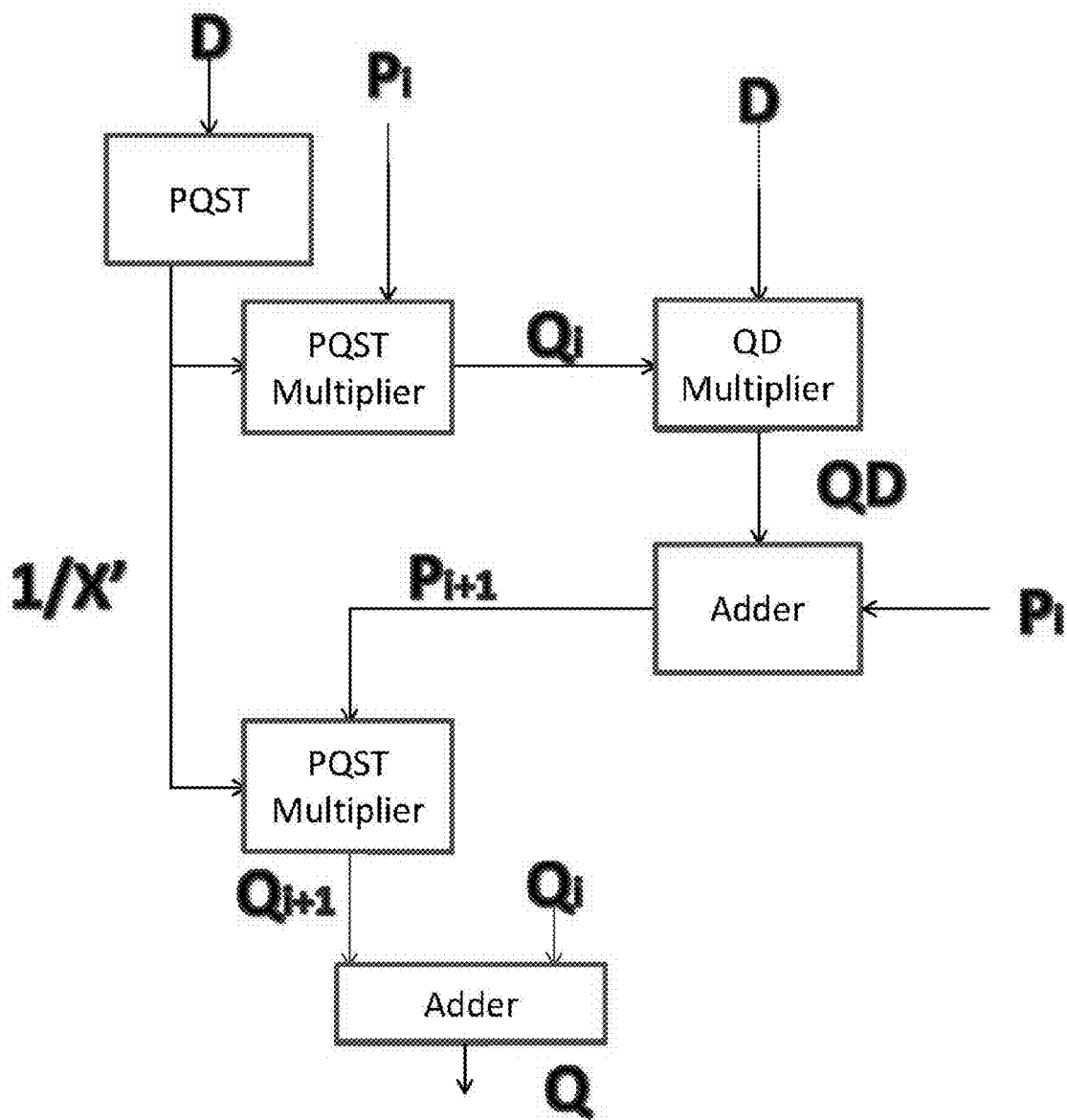
FIG. 7 shows a simplified block diagram of one exemplary embodiment of an asynchronous PSRT divider.

FIG. 7 shows one exemplary stage of a PSRT asynchronous version of the synchronous, or clocked, PSRT divider of FIG. 6. The asynchronous version was selected for testing since it only use one extra multiplier and adder in the second stage, and this asynchronous version does not require duplication of the PQST.

In some embodiments, the divider can follow the 16-bit IEEE-754r standard for floating point numbers, which is slightly different from the standard 32-bit IEEE 754 format. This format was selected since it has approximately the same dynamic range as 32-bit fixed-point numbers that are currently used in many FPGA divider implementations. (Wang, et. al., "Decimal Floating-point Division Using Newton-Raphson Iteration", Proceedings of IEEE International Conference on Application-Specific System, Architectures and Processors, pgs 84-95, September 2004). In addition, using the 16-bit format, a Radix-64 divider can compute the entire quotient in two iterations. Furthermore, since the second iteration is within 1 ULP of the final quotient, the last stage only needs a multiplier to determine the quotient digit, Qi. So instead of a synchronous design, in some embodiments, the divider can be made asynchronous at the expense of one extra multiplier.

The IEEE 754r floating point standard has 1 sign bit, 5 exponent bits, and 10 mantissa bits. In normalized form, the 11th bit of the mantissa is a leading '1', and is not included in the floating point number. Since all numbers use signed magnitude format, and not 2's complement format, all values must be positive. So, the sign bit indicates sign, and the exponent is biased by −15. Table 3 is a bit representation table of the IEEE 754r format is shown below. This format is Big-endian, with the most significant bit to the left, and the least significant bit at the right:

TABLE 3

| 15 | 14 13 12 11 10 | 9 8 7 6 5 4 3 2 1 0 |
|---|---|---|
| Sign | Exponent | Mantissa |

According to this format, the Mantissa is at most, 11 bits long when it is normalized. For example, a binary number 1 01111 0000000001 in IEEE 754r normalized format is −1.00098e0 in decimal form. The sign bit is one. The next five bits, are 15−15=0. Assuming a '1' in the 11th position, the next 10 bits equal 0/2+014+ . . . 1/1024, or 0.00098. So the total number is −1.00098e0. Similarly, to convert a decimal number, 2.25e1 base 10 into IEEE 754r format, the mantissa 2/1+0/1+0/2+¼, or 0 0010000000. Then the leading '1' is dropped since it is implied. Next, since the exponent is 1, the bias of 15 is added to write the exponent as 16, or 10000. Since 2.25e1 is positive, the sign is 0. Therefore, the representation for 2.25e1 base 10 in IEEE-754r format is: 0 10000 0010000000.

Figure 8:
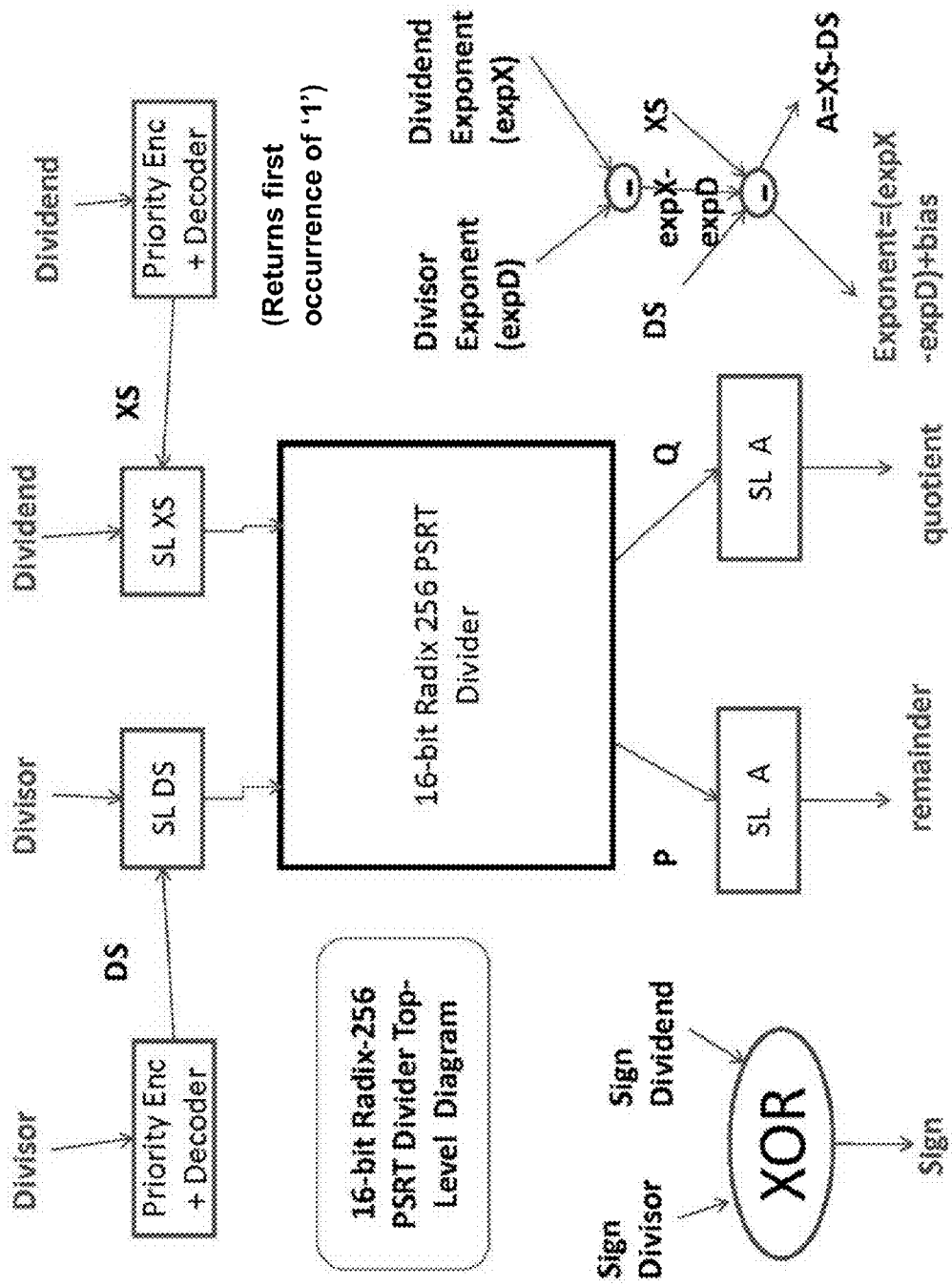
FIG. 8 shows a more detailed block diagram of a clocked type PSRT divider similar to that shown in FIG. 6.
Figure 9:
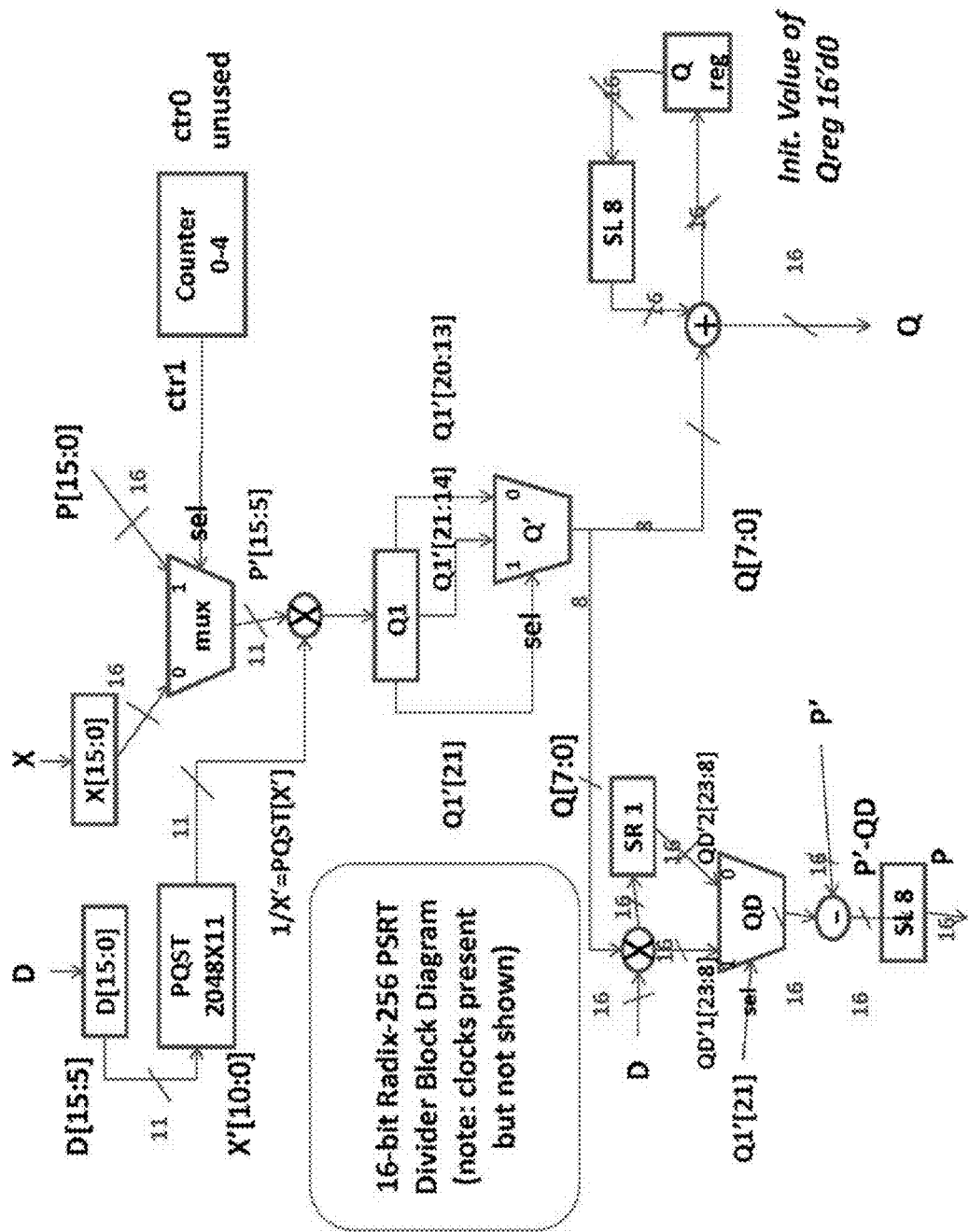
FIG. 9 shows a block diagram of the 16-bit Radix-256 PSRT divider block of FIG. 8.

One exemplary embodiment of a synchronous, or clocked, PSRT divider is described in more detail. FIG. 8 shows a more detailed block diagram of a clocked type PSRT divider similar to that shown in FIG. 6. The PSRT divider shown in FIG. 8 is a 16-bit Radix-256 divider using a floating point format. The flow of FIG. 8 will be seen to correspond to the detailed general method for PSRT division as outlined below. Each rectangle in FIG. 8 represents a register. FIG. 9 shows a block diagram of the 16-bit Radix-256 PSRT divider of FIG. 8 as performed on the mantissa. Data is in a big-endian format (sign exponent mantissa). The dividend and divisor are pre-scaled, and fed into the divider as operands X, and D respectively at the top of FIG. 9.

The divisor is spliced and entered into the PQST table. The PQST table outputs the inverse of the divisor to n+3 bits. The inverse of the divisor is then multiplied by the foremost n+3 bits of the partial remainder, which is selected from either the divided, or the partial reminder computer from the previous cycle by a control circuit which in the exemplary block diagram of FIG. 9, is depicted as a counter. The selected value is P'. The output of this multiplication stage is Q', or an extended version of the quotient bit. Note that Q is normalized so that the first bit is 1. At most, Q is shifted left by 1.

Continuing with the block diagram of FIG. 9, the quotient bit is truncated to n bits (Q[7:0]) and multiplied by the divisor, D and subtracted from the current partial remainder (P') selected in the previous stages. The next partial remainder is P'−QD, and called P. P is shifted right by 8, and stored as the next partial reminder.

Generally, the components shown from the top of FIG. 9 through Q' are positive-edge clocked, and the lower components are negative edge clocked. The counter can be clocked on both edges, so its rate is twice that of other components. By clocking the counter on both edges, the next partial remainder is available to calculate the next quotient bit by the next positive edge.

General Formula for PSRT Division

In PSRT X' is the divisor reciprocal to N+3 digits, where N is the number of digits in radix-R. Generally, $N=\log_b R$ where b is the base of computation. For example, for a radix-64 divider in base 2, b=2, R=64, $N=\log_b R=\log_2 64=6$, and N+3=6+3=9. PSRT uses N+3 precision to prevent the quotient digit from going negative. If the quotient digit went negative, PSRT would require a redundant digit set, which generally takes up twice the resources in the quotient selection logic. PSRT is non-restorative. Unlike SRT, the quotient digit never goes negative. The reason why the quotient digit never goes negative was shown above by theorem 2 (quotient approximation).

The section shows that if we truncate the divisor reciprocal towards zero (that means just truncate to the first n+3 bits), and have n+3 digits precision, then the quotient digit will always be equal to the actual quotient digit on the range (0, −½) in the last place. Since an acceptable error in a divider is one unit in the last place, the result is valid. Secondly, PSRT is normalized to eliminate the need for correction hardware. PSRT assumes IEEE-754 normalized format. This step can be done using pre-shifters and post-shifters or another technique already published to shift the numbers. Unlike other products, PSRT operands do not have to be scaled, which would have required extra multiplication.

One general method for PSRT division now follows:
1) Let b be the base of computation, the divisor be D, the dividend be X, Q[i] be the current quotient bit, and Q be the final quotient, and Pi be the partial remainder, and n be the number of digits in Radix-R, where n is the number of digits of the quotient computed at a time, and n, b and r have the relationship $n=\log_b R$. Set Q to zero initially. In short Let D=divisor, X=dividend, Q[i]=ith quotient digit (left-to-right), Q=quotient, $n=\log_b R$ where b=base of computation n=# of digits computed/iteration, R=radix of divider.
2) Calculate PQST[j]=$b^{n+2}$/a for a=$b^{n+3}$ to $b^{n+4}-1$, and j=a−$b^{n+3}$. PQST[ ] is always all (b−1) in each place. You may either store the result in the PQST or, if you are working in base 2 and want to save space, since the first bit of PQST[j] is always '1' take the first n+3 digits of this result, store the last n+2 digits of the result's leftmost n+3 digits in the PQST logic, so when a value is retrieved from the PQST, a '1' is appended to the left-most bit.
3) Let the first partial remainder be the dividend, X. Let i be the number of iterations. Set i to 0. In short, P[0]=X. P[i]=$i^{th}$ partial remainder, i=0.
4) Let X' be the first n+3 digits of the dividend, X. Calculate PQST[X'] and multiply it by the first n+3 digits of the Partial remainder, P[i]', and store this value as the quotient digit Q'[i]. Take the leftmost n digits of Q'[i] and store it in Q[i]. Shift Q[i] right by n+2 places. In short Q'[i]=P[i]'*PQST[X] where X'=leftmost n+3 digits of X. P[i]'=leftmost n+3 digits of P[i]' and Q[i]=leftmost n digits of Q'[i]/$b^{n+2}$.
5) Subtract the product of the quotient digit and dividend Q[i]*D from the full partial remainder, P[i], and store this value as the next partial remainder P[i+i]. In short P[i+1]=P[i]−Q[i]*D.
6) Let Q=Q+Q[i]. Shift Q left by n digits. In short Q=(Q+Q[i])*$b^n$.
7) Shift the partial remainder P[i+1] left by n digits. In short P[i+1]=P[i+1]*$b^n$.
8) Increment i. In short (i=i+1).
9) Repeat steps 4-7 until i=ceil(W/n), where W is the number of digits in the dividend. At this step the partial remainder is the actual remainder, and the quotient is Q. The precision of accuracy of the quotient, Q, is the number of digits in W. In order to get the same accuracy for the remainder, add an additional ceil(W/n) repetitions of steps 4-7.
10) Optional: Post-scale the result (shift) so that it is normalized to the range (0,b).

Note that pre-scaling of operands is not included in the general formula. The operands are assumed to be of the same order, but this can be done using pre-shifters/post-shifters or some other method. The PSRT system and method can be implemented in part or in whole either hardware of software.

EXAMPLE OF GENERAL METHOD (BASE-10)

In the following examples each step of the general formula is shown:
1) Divisor, D=1.99020103; Divided, X=1.51563451; base b=10; Radix R=1000; $n=\log_b R=3$; Q=quotient. We scale D to 199020103, and scale X to 151563451.
2) Since n=3, the width of the PQST is n+3=6 digits. PQST [j]=$10^5$/a for a=$b^6$ to $b^7-1$, and j=a−$b^6$. In short PQST[0]= 0.999999. PQST[1]=100000/1000001=0.999990, PQST[3]= 100000/1000003=0.999970, all the way up to PQST [999999]=0.0500000.
3) The first partial remainder is X=1.51563 and i=0, so P[0]= X=151563451
4) The leftmost n+3=6 digits of the dividend, P[0]=X is P[0]'= X'=151563. Q[0]=X'*PQST[D']=151563*100000/199020= 76154.6. and Q[0]=leftmost n digits of Q[0]=76100. Shift Q[0] right by n+2 places so Q[0]=0.76100
5) Next calculate the partial remainder, P[i+1]=P[i]−Q[i]*D.

$$P[1]=P[0]-Q[0]*D \to P[1]=151563451-0.76100*199020103=109153.$$

6) Add bits to quotient. Q=Q+Q[i]Q=0+Q[0]=0+ 0.76100=0.76100. Shifting Q left by n places, shifts q left by 3 places, so that Q=0.761*1000=761.

7) Shift the partial remainder left by n=3 places. P[1] now is 109153000.

8) Incrementing i so that i=1. There are 9 digits in each operands so the operand width, W=9. Next we will repeat steps 4-7 until i=ceil(W/N)=ceil(9/3)=3.

4) Since i is now 1, P[i] is now P[1]=109153. The leftmost n+3=6 digits of the current dividend, P[1] is now P[1]'=109153. Q'[1]=X'*PQST[D']=109153*100000/ 199020=54845.2 and Q[1] is the leftmost n=3 digits of Q[1]= 548000. Shift Q[1] right by n+2=5 places so that Q[1]=0.548.

5) Next calculate the partial remainder, P[i+1]=P[i]−Q[i]*D.

$$P[2]=P[1]-Q[1]*D \rightarrow P[2]=109153000- 0.54800*199020=89983.6.$$

6) Add bits to quotient. Q=Q+Q[i]Q=0761+Q[1]=761+ 0.548=761.548. Shifting Q left by n places, shifts q left by 3 places, so that Q=761.548*1000=761548.

There can be one more iteration in this example for full precision, but at this step, if we normalize Q=761548 to Q=0.761548, we can see that Q resembles the actual quotient which is 1.51563451/1.99020103=0.761548450208057 by 6 digits. The extra iteration is included for worst-case divisions.

Part VI: PSRT Implementation Results and Comparisons

PSRT was implemented as a 16-bit floating point divider in Verilog, and verified using Modelsim® (available from Mentor Graphics, Wilsonville, Oreg.). For a Verilog implementation, a program called QSTgen was created in C++ and used to create the PQST tables. Screenshots of some of the functional verification tests in Modelsim® are shown in FIG. 21 through FIG. 24. An Appendix lists the source code for QSTgen. After verification, PSRT was implemented using Xilinx ISE® Design Suite 10.1 and targeted for both the low-end Spartan-3 XCS200 FPGA, and the high-end Virtex™-II Pro FPGAs (both available from Xilinx, Inc., 2100 Logic Drive, San Jose, Calif. 95124-3400). Xilinx Tools were used to extract test results, which included area, maximum delay, and power consumption. Test results are presented below. To simplify design, all numbers in the tests are normalized.

Table 4 compares the results of Pan et al. for the estimated QST and the PQST used by PSRT. Depending upon the Radix, the size of the PQST is 3-25 times smaller than the size of the RQST and QHT combined, and 307 to 18724 times smaller than the traditional QST.

TABLE 4

Comparison of PQST Size

| Radix | Size of PQST (in bits) | Size of RQST + QHT (in bits) | Size of Conventional QST (in bits) |
|---|---|---|---|
| 8 | 160 | 0.5k | 48K |
| 16 | 384 | 4k | 1M |
| 32 | 896 | 22k | 16M |

Figure 10:
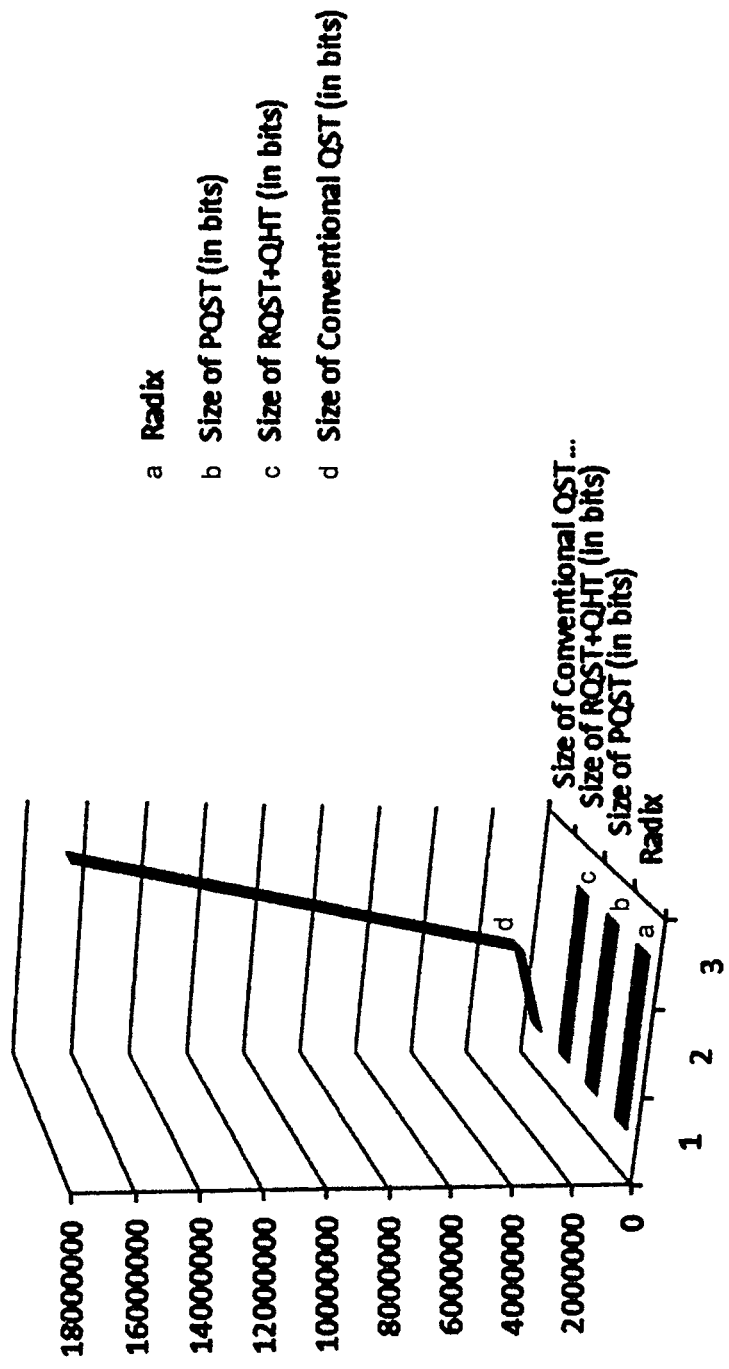
FIG. 10 shows a graphical representation of the PQST compared to Pan's study and traditional QST sizes.

FIG. 10 shows a graphical representation of the PQST compared to Pan's study and traditional QST sizes. It can be seen that both Pan's results and the PQST are much smaller than a traditional QST.

Figure 11:
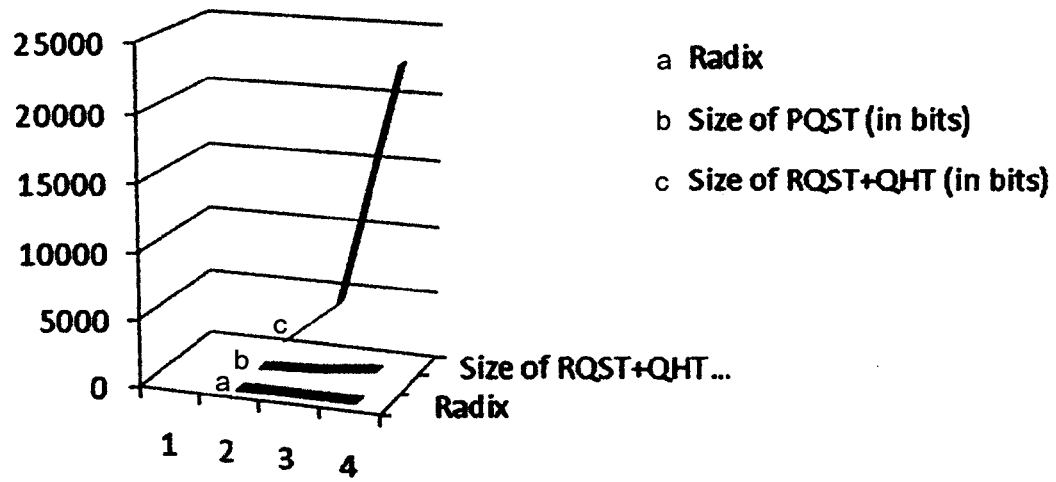
FIG. 11 shows a comparison between PSRT size and Pan's combined RQST+QHT only.

FIG. 11 shows a comparison between PSRT size and Pan's combined RQST+QHT only. FIG. 11 shows that while Pan's combined RQST and QHT are smaller than a traditional QST, Pan's combined RQST and QHT still exhibits quadratic growth with Radix. By contrast, the PQST size in bits exhibits a roughly linear growth with Radix and is therefore much smaller. Furthermore, the size difference between the PQST and other QSTs increases with Radix, making PSRT suitable for higher radices. Therefore, using PSRT decreases the size of the QST significantly.

We turn now to growth of the PQST table with Radix. As stated in PART III, the Quotient Selection Table (QST) grows quadratically with the Radix. The size of the PQST is smaller than a traditional QST, and grows roughly linearly with Radix. The tables below show linear growth both in terms of ROM size, and FPGA area as well as how the size of the PQST grows with Radix. The increase factor is the size of the PQST for the current Radix in bits divided by the size of the PQST for the previous Radix in bits. As the Radix increases, the increase factor approaches, but is never less than 2. Each two-fold increase in R produces a roughly two-fold increase in PQST size, so the PQST grows approximately linearly with Radix. The multiplier size in bits shown in Table 5 below indicates that extra multiplier bits are required after the PQST to calculate the quotient digit, $Q_i$.

TABLE 5

Growth of PQST Table in ROM

| Radix | Size of PQST in ROM | Rom Dimensions | Multiplier Size | Increase Factor of PQST ROM Size |
|---|---|---|---|---|
| 4 | 64 | 16 × 4 | 5 | 1 |
| 8 | 160 | 32 × 5 | 6 | 2.50 |
| 16 | 384 | 64 × 6 | 7 | 2.40 |
| 32 | 896 | 128 × 7 | 8 | 2.33 |
| 64 | 2K | 256 × 8 | 9 | 2.29 |
| 128 | 4.5K | 512 × 9 | 10 | 2.25 |
| 256 | 10K | 1024 × 10 | 11 | 2.22 |
| 512 | 22K | 2048 × 11 | 12 | 2.20 |
| 1024 | 48K | 4096 × 12 | 13 | 2.18 |
| 2048 | 104K | 8192 × 13 | 14 | 2.17 |

The size of the multiplier in Table 5 grows only logarithmically with Radix, and is therefore relatively small. For example, a Radix-64 divide requires a 9-bit multiplier.

Figure 12:
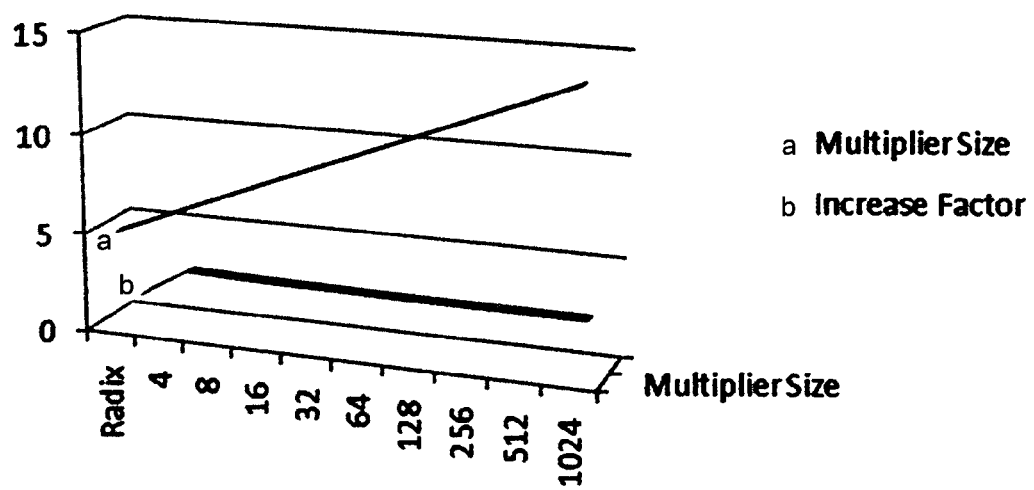
FIG. 12 shows a graphical representation of the data presented in Table 5.

FIG. 12 shows a graphical representation of Table 5, and shows how the size of the PQST grows with Radix. It can be seen that the percent increase in size of the PQST for a given Radix over the size of the PQST for a previous Radix decreases as the Radix increases.

Figure 13:
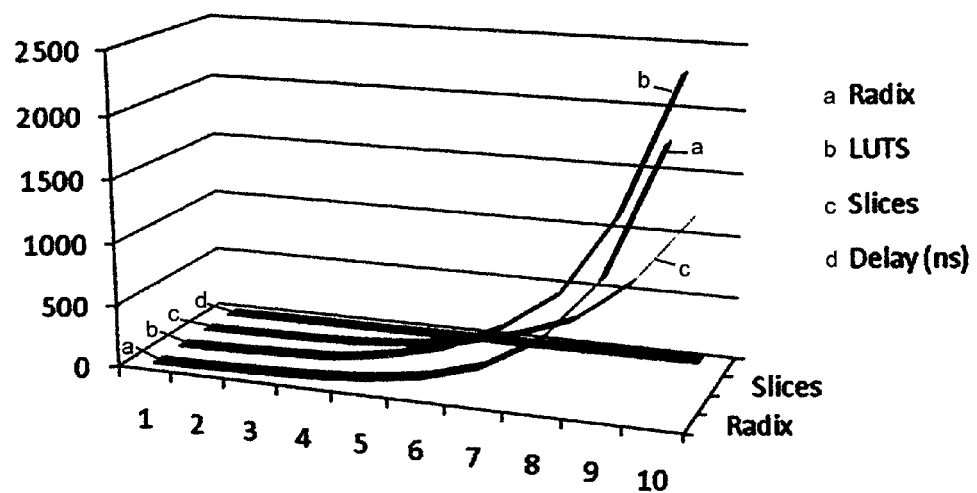
FIG. 13 shows a graphical representation of the data presented in Table 6.
Figure 14:
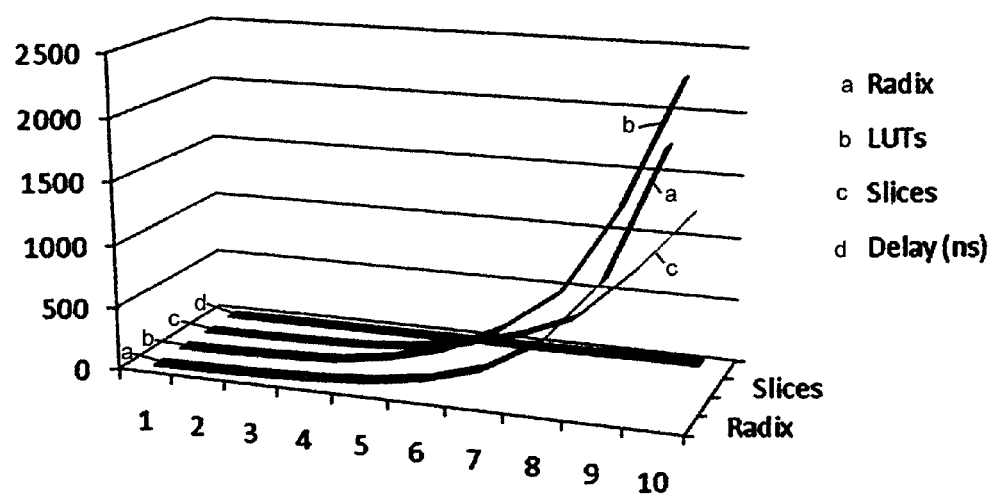
FIG. 14 shows a graphical representation of the data presented in Table 7.

Table 6 and Table 7 below show the size of the PQST in both LUT block and Slices for the Spartan-3 and Virtex-II FPGAs. The size of the PQST on FPGA increases slightly sub-linearly with Radix. The delay column shows the worst case delay of the units in nanoseconds. The results of both FPGAs agree with the result from Oberman and Flynn, and the delay on the QST increases roughly logarithmically with Radix. FIG. 13 and FIG. 14 are graphical representations of the data presented in Table 6 and Table 7 respectively. FIG. 13 and FIG. 14 visually demonstrate the roughly linear growth of the size of the PQST with Radix, and the roughly logarithmic growth of the delay of the PQST with Radix.

TABLE 6

PQST Size on Spartan-3

| Radix | LUTS | Slices | Delay (ns) |
|---|---|---|---|
| 4 | 4 | 4 | 7.41 |
| 8 | 8 | 4 | 7.76 |
| 16 | 21 | 11 | 9 |

TABLE 6-continued

PQST Size on Spartan-3

| Radix | LUTS | Slices | Delay (ns) |
|---|---|---|---|
| 32 | 39 | 23 | 8.53 |
| 64 | 108 | 59 | 10.63 |
| 128 | 213 | 118 | 12.4 |
| 256 | 417 | 234 | 14.74 |
| 512 | 736 | 401 | 17.48 |
| 1024 | 1397 | 749 | 20.73 |
| 2048 | 2463 | 1296 | 24.59 |

TABLE 7

PQST Size on Virtex-II Pro

| Radix | LUTs | Slices | Delay (ns) |
|---|---|---|---|
| 4 | 4 | 3 | 5.41 |
| 8 | 8 | 5 | 5.23 |
| 16 | 21 | 11 | 7.18 |
| 32 | 39 | 21 | 6.61 |
| 64 | 108 | 56 | 8.71 |
| 128 | 220 | 125 | 10.95 |
| 256 | 431 | 247 | 13.07 |
| 512 | 759 | 428 | 14.34 |
| 1024 | 1453 | 847 | 21.44 |
| 2048 | 2450 | 1344 | 21.01 |

Surprisingly, the differences between the delays of the low-end Xilinx Spartan 3, and the Xilinx Virtex-II Pro FPGAs decrease with Radix. For Radix 4, the Virtex-II Pro FPGA is 30% faster than the Spartan-3. For Radix 2048, this difference drops to 14%.

Table 8 and Table 9 show the multiplier size, and delay as the Radix increases for the Spartan-3 and Virtex-II Pro FPGAs for two special cases: 1) the column LUT delay shows the delay if no Xilinx-Specific multipliers are used. This option is useful since a design can implemented on other FPGA platforms that do not contain built-in multipliers. 2) The column Block Delay shows the multiplier delay if the Xilinx Built-in 18×18 bit multipliers are used instead.

Figure 15:
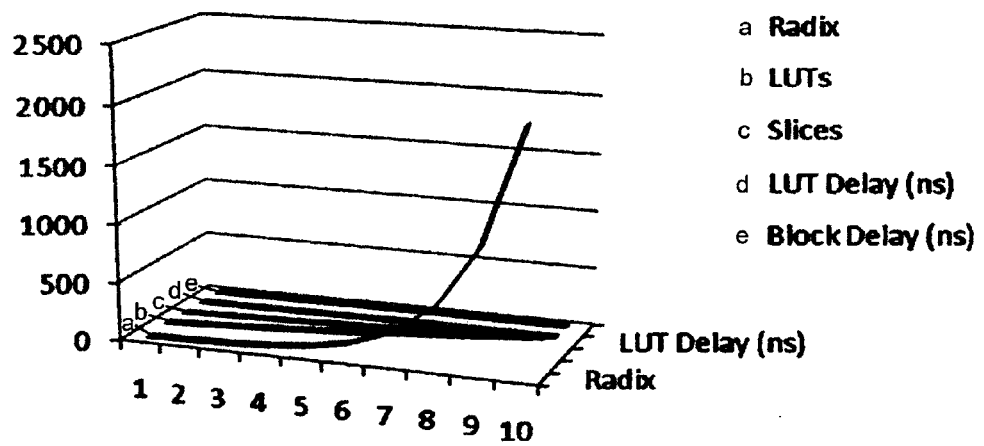
FIG. 15 shows a graphical representation of the data presented in Table 8.
Figure 16:
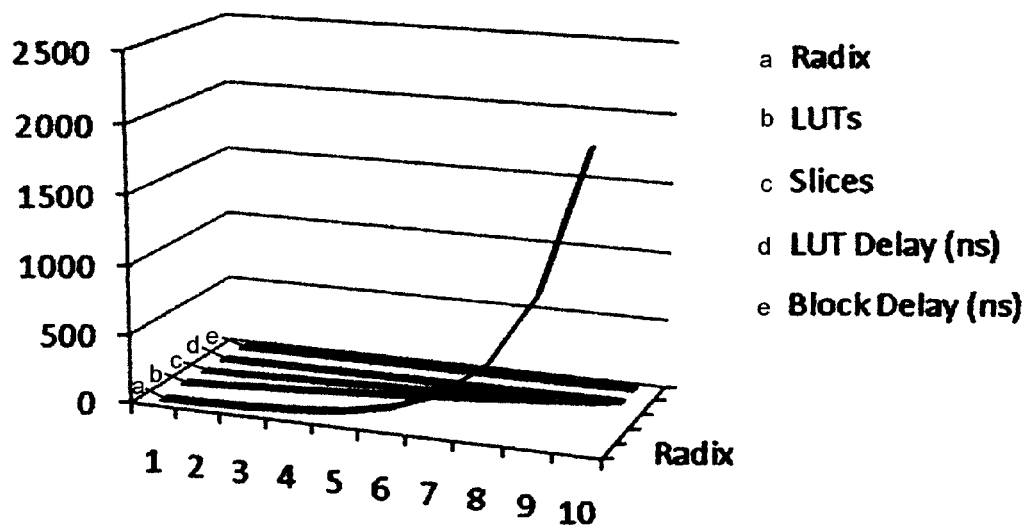
FIG. 16 shows a graphical representation of the data presented in Table 9.

FIG. 15 and FIG. 16 show graphical representations of Table 8 and Table 9 respectively. From both figures it can be seen that delay and the total number of LUTs in the PSRT divider has a logarithmic relationship to Radix.

TABLE 8

Multiplier Size on Spartan-3

| Radix | LUTs | Slices | LUT Delay (ns) | Block Delay (ns) |
|---|---|---|---|---|
| 4 | 27 | 16 | 14.49 | 10.42 |
| 8 | 39 | 21 | 14.17 | 11.09 |
| 16 | 56 | 30 | 15.66 | 11 |
| 32 | 72 | 37 | 15.48 | 11.16 |
| 64 | 93 | 49 | 17.97 | 11.44 |
| 128 | 113 | 58 | 20.11 | 12.45 |
| 256 | 139 | 72 | 20.62 | 12.37 |
| 512 | 164 | 83 | 19.06 | 12.75 |
| 1024 | 192 | 99 | 21.09 | 12.51 |
| 2048 | 220 | 112 | 20.64 | 12.66 |

TABLE 9

Multiplier Size on Virtex-II Pro

| Radix | LUTs | Slices | LUT Delay (ns) | Block Delay (ns) |
|---|---|---|---|---|
| 4 | 27 | 16 | 10.99 | 7.44 |
| 8 | 39 | 21 | 11.66 | 8.28 |
| 16 | 56 | 30 | 11.62 | 8.32 |
| 32 | 72 | 37 | 12.24 | 8.87 |
| 64 | 93 | 49 | 14.14 | 9.99 |
| 128 | 113 | 58 | 15.26 | 8.87 |
| 256 | 139 | 72 | 15 | 9.41 |
| 512 | 164 | 83 | 14.85 | 9.8 |
| 1024 | 192 | 99 | 16.59 | 9.92 |
| 2048 | 220 | 112 | 15.97 | 10.14 |

The area of the multiplier increases only logarithmically with Radix for both FPGAs. On average, using a built-in multiplier decreases delay from 28-38% over not using any built in multipliers. FIG. 15 and FIG. 16 show that as the Radix increases that the multiplier delay, LUT delay, and the area of the multiplier increase logarithmically on both Spartan-3 and Virtex-II Pro FPGAs.

Figure 17:
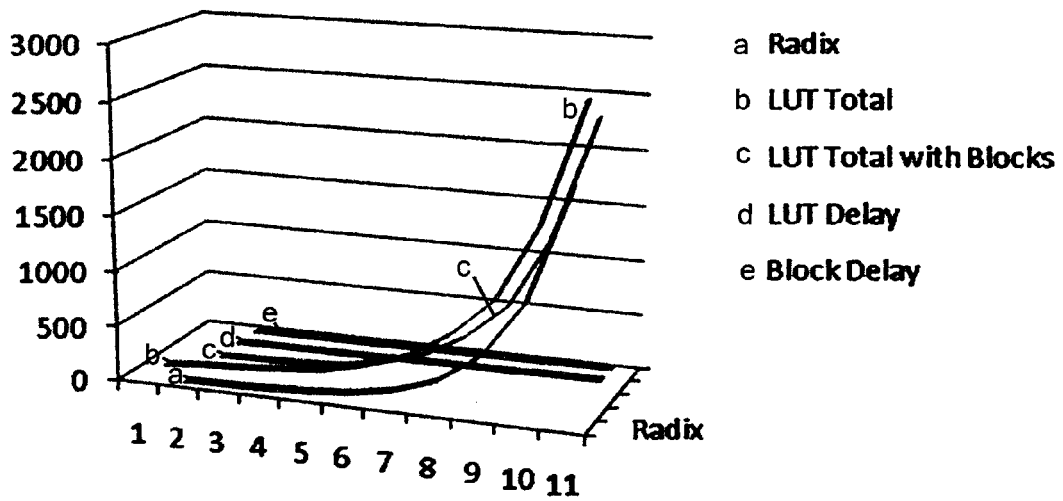
FIG. 17 shows a graphical representation of the data presented in Table 10.
Figure 18:
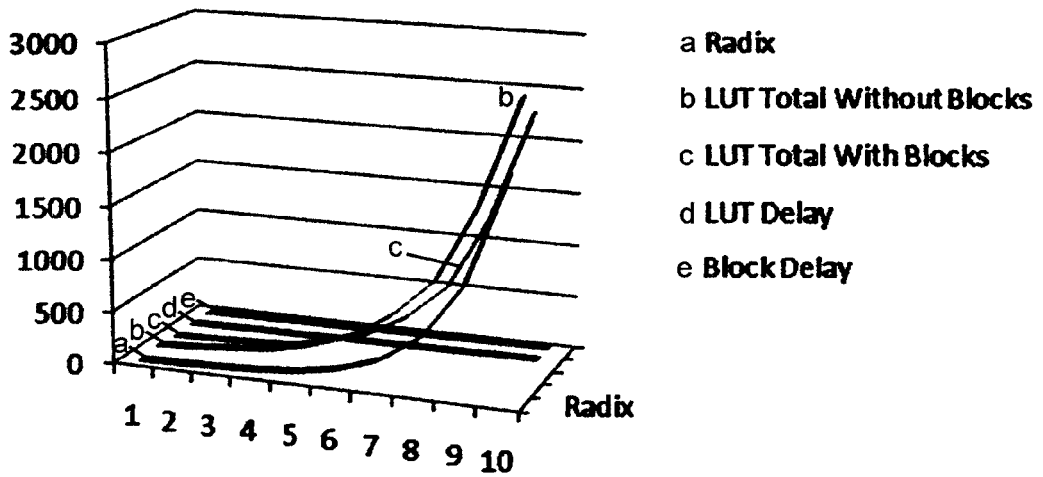
FIG. 18 shows a graphical representation of the data presented in Table 11.

The next two tables, Table 10 and Table 11 show the combined area and delay for the PQST and its multiplier for the Spartan-3 and Virtex-II Pro FPGAs. Radix-64 was chosen in both cases since the size of the multipliers and the PQST in LUTs are approximately equal as shown in Table 6, Table 7, Table 8, and Table 9. For Radix 64, the PQST and Multiplier take approximately 100 LUTs each for the Spartan-3 FPGA, and the Virtex-II Pro FPGA. FIG. 17 and FIG. 18 tom are graphical representations of Table 10 and Table 11 respectively.

The total area of the PQST and Multiplier increases slightly sub-linearly with Radix, while the Delay increases logarithmically. In Table 10 and Table 11, the LUT delay is the delay of the design not using multiplier blocks, and the Block delay is the delay using multiplier blocks. On average, the total number of LUTs decreases significantly using the multiplier blocks for lower radices such as Radix-64 and less, with a total area savings of 50%. The delay decrease from using multiplier blocks decreases from 21% to 15% for radices 4-2048. These results indicate that multiplier blocks should be used for low to high Radix (Radix-64) PSRT dividers. Very high Radix PSRT dividers, or dividers Radix 1024 and above, could use either multiplier blocks or LUT only implementations.

TABLE 10

PQST + Multiplier Size and Delay on Spartan-3

| Radix | LUT Total Without Blocks | LUT Total with Blocks | LUT Delay | Block Delay |
|---|---|---|---|---|
| 4 | 31 | 4 | 21.9 | 17.83 |
| 8 | 47 | 8 | 21.93 | 18.85 |
| 16 | 77 | 21 | 24.66 | 20 |
| 32 | 111 | 39 | 24.01 | 19.69 |
| 64 | 201 | 108 | 28.6 | 22.07 |
| 128 | 326 | 213 | 32.51 | 24.85 |
| 256 | 556 | 417 | 35.36 | 27.11 |
| 512 | 900 | 736 | 36.54 | 30.23 |
| 1024 | 1589 | 1397 | 41.82 | 33.24 |
| 2048 | 2683 | 2463 | 45.23 | 37.25 |

TABLE 11

PQST + Multiplier Size and Delay on Virtex-II Pro

| Radix | LUT Total Without Blocks | LUT Total With Blocks | LUT Delay | Block Delay |
|---|---|---|---|---|
| 4 | 31 | 4 | 16.4 | 12.85 |
| 8 | 47 | 8 | 16.89 | 13.51 |
| 16 | 77 | 21 | 18.8 | 15.5 |
| 32 | 111 | 39 | 18.85 | 15.48 |
| 64 | 201 | 108 | 22.85 | 18.7 |
| 128 | 333 | 220 | 26.21 | 19.82 |
| 256 | 570 | 431 | 28.07 | 22.48 |
| 512 | 923 | 759 | 29.19 | 24.14 |
| 1024 | 1645 | 1453 | 38.03 | 31.36 |
| 2048 | 2670 | 2450 | 36.98 | 31.15 |

From FIG. 17 and FIG. 18 tom, it can be seen that the total area of the PQST and Multiplier increases slightly sub-linearly with Radix, while the Delay increases logarithmically.

Figure 19:
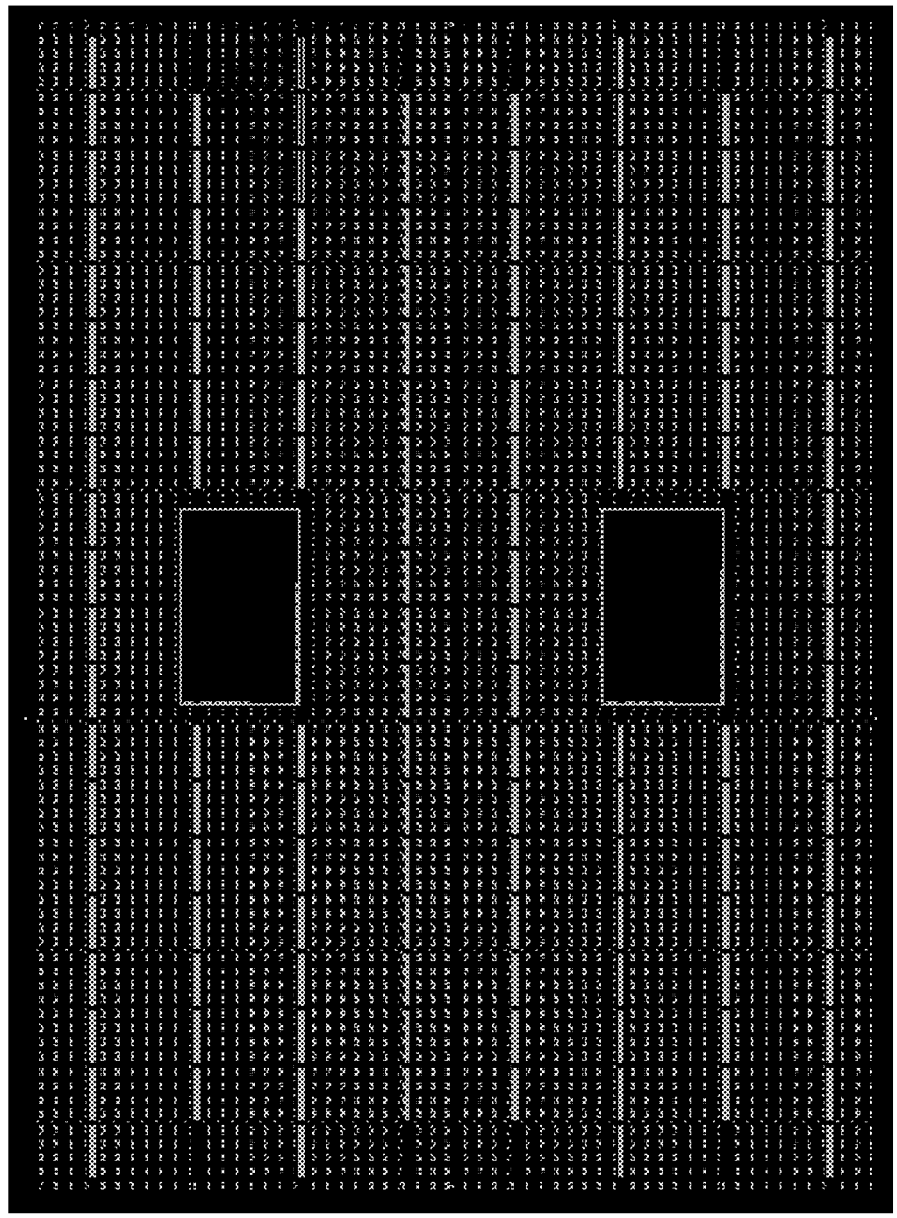
FIG. 19 shows a floor plan for a routed Virtex-II Pro Design.
Figure 20:
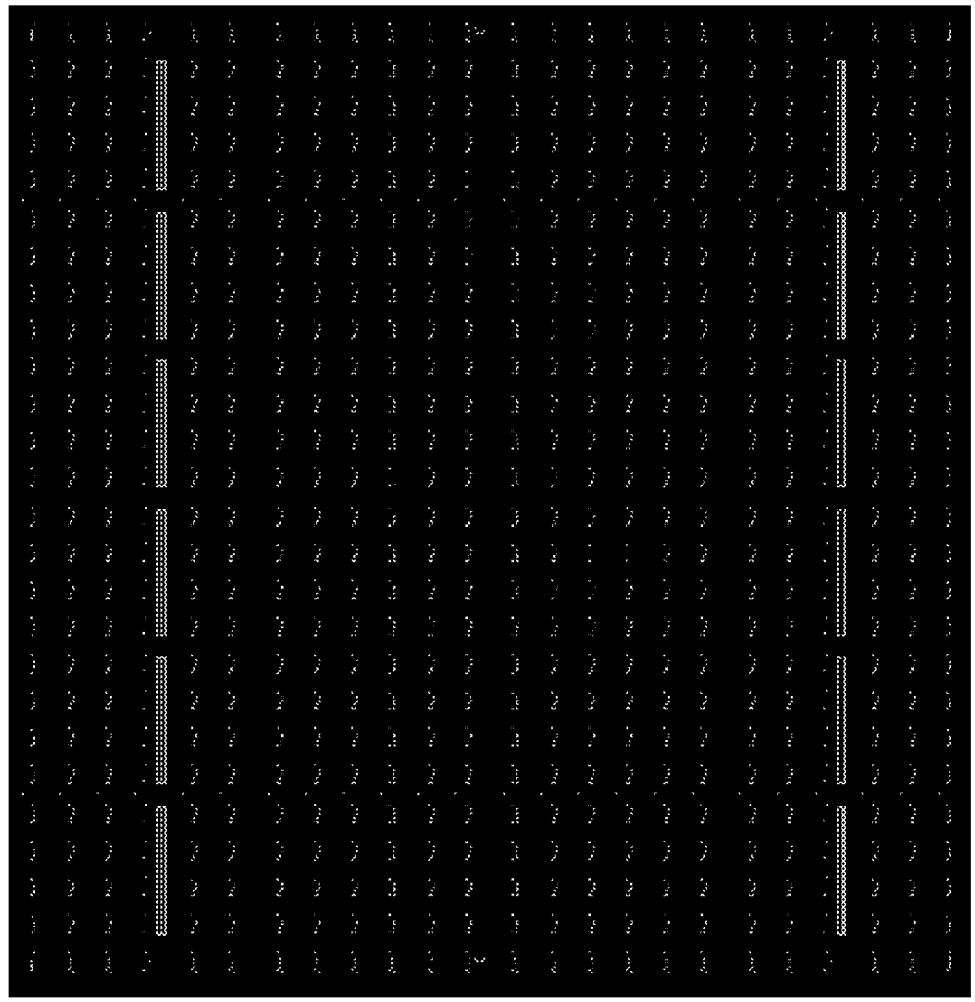
FIG. 20 shows a floor plan for a routed Spartan-3 design.

Turning now to area delay and power for 16-bit Floating Point PSRT Divider, to get the most accurate measurements, the Area, Delay, and Power statistics for the PSRT were taken post Place and Route, or the step before the design is programmed on to a selected FPGA. FIG. 19 and FIG. 20 show the floor plan for the Virtex-II and Spartan-3 FPGAs. FIG. 19 shows a floor plan for a routed Virtex-II Pro Design. FIG. 20 shows a floor plan for a routed Spartan-3 design. In both cases, the PSRT divider uses relatively little area.

Table 12 and Table 13 show the area and delay statistics for the 16-bit floating point divider.

TABLE 12

Implementation Spartan-3

| Multiplier Option | LUTS | Slices | Utilization | Delay |
|---|---|---|---|---|
| LUT | 410 | 223 | 10% | 53.37 |
| Block | 201 | 114 | 5% | 37.9 |

TABLE 13

Implementation Virtex-II Pro

| Multiplier Option | LUTs | Slices | Utilization | Delay |
|---|---|---|---|---|
| LUT | 395 | 215 | 1% | 45.08 |
| Block | 206 | 113 | 1% | 28.87 |

In both cases, the Block implementation has half the area and 30% delay reduction over a LUT only implementation. The utilization of chip resources (in LUT area) is relatively low; it decreases from 5-10% on the Spartan-3 to 1% on the Virtex-II Pro FPGA.

Table 14 shows the power statistics and junction temperature for the PSRT divider on the Spartan-3 FPGA.

TABLE 14

Power Statistics Spartan-3

| Multiplier Option | Idle Power | Active Power (mW) | Total Power (mW) | Junction Temp (° C.) |
|---|---|---|---|---|
| LUT | 41.5 | 84 | 125.5 | 28.9 |
| Block | 41.1 | 21.4 | 62.5 | 26.9 |

The Xilinx setting assumed an ambient temperature of 25° C. The power consumed by the Block implementation is approximately half the power consumed by the LUT only implementation. The power consumption results in Table 14 agree with the area results shown in Table 12 since the LUT only implementation contains twice the area of the Block implementation, and power consumption is proportional to area. Interestingly, the block implementation consumes only 62.5 mW.

Turning now to a comparison of the PSRT divider with SRT dividers, Nikolas Sorokin did a study in 2006 experimenting with using a multiplicative method for 32 bit fixed point to improve the speed of SRT on Xilinx Virtex-II Pro FPGAs. This study was chosen since the decimal point is fixed in both fixed point and IEEE standard normalized numbers, so the results can be compared by the mantissa size. In the fixed point version, the mantissa is 32 bits long, and in the PSRT divider, the mantissa is 11 bits long. (Sorokin).

Table 15 compares the commercial Xilinx IP Core in Sorokin's study statistics to the 16-bit PSRT divider. The divisor has a width of 32 in the 32 bit divider, and a width of 11 in the 16-bit PSRT divider. Both dividers are targeted for Virtex-II Pro FPGAs, and do not use any Xilinx-specific parts such as built-in multipliers. Although the operand width of the divider presented here is ⅓ the size of the operand in the study, both the size of the PSRT divider decreases by a factor of 5.58, and the latency of the PST divider decreases by factor of 7.76. These size and speed improvements are due, in part, to the fact that the 16-bit PSRT divider's operand width is ½ that of the divider presented in Sorokin's study. However, if we assume that both the size and latency of the PSRT divider would increase by a factor of 4 for the 32-bit implementation, the PSRT divider would still have a noticeable speed and area difference. In the 32 bit case, a 4× slower, and 4× larger 32-bit PSRT divider would have an area 1.40 times smaller, and 1.94 times faster than the divider presented in Sorokin's study.

TABLE 15

Area and Delay Comparison of Xilinx 32-bit SRT and 16-bit PSRT divider

| Implementation | LUTS | Total Delay (ns) |
|---|---|---|
| Xilinx IP Core | 2240 | 350 |
| 16-bit PSRT | 401 | 45 |

Table 16 compares the delay of Sorokin's proposed divider to the delay of the 16-bit PSRT divider.

TABLE 16

Area and Delay Comparison of Sorokin's and 16-bit PSRT divider

| Implementation | Total Delay (ns) |
|---|---|
| SRT Standard | 854 |
| Sorokin's Restoring Algorithm | 597 |
| Sorokin's Non-Restoring Algorithm | 265 |
| PSRT (Virtex-II/Spartan-3) | 45/53 |

When compared to the standard 32-bit SRT, the 16-bit divider delay decreases by a factor of 19 using the Virtex-II and a factor of 16 using the Spartan-3. When compared to the non-restoring algorithm presented in Sorokin's study, the delay of a 16-bit PSRT divider decreases by a factor of 5.9 using the Virtex-II and a factor of 5 using the Spartan-3. For a better comparison, if we assume that both the size and latency of the PSRT divider, would increase by a factor of 4 for the 32-bit implementation, delay of 16-bit PSRT divider decreases by a factor of 1.48 using the Virtex-II and a factor of 1.25 using the Spartan-3. In other words, the 32-bit PSRT divider would be 20-32% faster. So the area and delay improvements from using PSRT are significant, even when using a much cheaper FPGA.

We turn now to a comparison of PSRT with quadratic convergence dividers. SRT is a linear convergence method, and is usually much slower than quadratic convergence methods. However this comparison shows how PSRT relates to other division methods besides SRT. In 2005, Liu et al. conducted a study of a hybrid quadratic convergence algorithm using a reciprocal table of the divisor, and Taylor-series expansion. (Liu, et. al., "An Iterative Division Algorithm for FPGAs", ACM/SIGDA International Symposium on Field-Programmable Gate Arrays, pgs. 83-89, 2006). Table 17 Compares the throughput, or number of divisions per second for the non-pipelined 32-bit divider in the 2005 study versus the asynchronous PSRT divider. While Liu's divider uses an Altera FPGA, the PSRT here uses the Spartan-3 FPGA.

TABLE 17

Comparison of Non-Pipelined Version (Liu/PSRT)

| Application | Throughput M Div/s | LUTs | Memory (Bytes) | DSP/Mult | Power (mW) |
|---|---|---|---|---|---|
| LUT | 24.4/18.7 | 1437/410 | 768/0 | 0/0 | 378/125.5 |
| Block | 24.3/26.4 | 213/201 | 768/0 | 28/3 | 350/62.5 |

When compared to 32-bit quadratic convergence algorithms, 16-bit PSRT is slower. The PSRT divider is slower since although the divider has a higher throughput as shown in Table 17, the operand width for the divider in Liu's study is twice as long, so unless the speed gain for the PSRT divider is much faster, it is safe to conclude that due to extra hardware, the PSRT divider would perform slower than Liu's divider. This assumption is based upon the conservative estimate that a 32-bit PSRT divider would have 4× the size, and 4× the latency as a 16-bit PSRT divider. However, PSRT still consumes fewer resources and consumes much less power with the Spartan III implementation having a peak power consumption of only 62.5 mW.

If both designs use LUTs only, the 16-bit PSRT divider consumes 71.5% less area. The PSRT divider also consumes up to 66.8% less power using LUTs only. However, if both designs use Multiplier/DSP blocks, the PSRT divider uses relatively the same number of blocks, uses over 99% less RAM, and consumes 82.2% less power than the non-pipelined version of the 2005 divider. So although the PSRT divider actually performs relatively slower in terms of delay, the difference in terms of FPGA resources and power consumption improvements are still significant. In addition, Table 17 does not account for the fact that the PSRT divider does not use any bytes of RAM. If the 768 Bytes of Internal RAM used by the divider in the 2005 study were accounted for, then the area difference for the PSRT divider would be greater.

Although test results have shown that PSRT consumes much less area and has a smaller delay than traditional SRT, PSRT is slightly slower that other quadratic convergence division methods based upon the conservative estimate that a 32-bit PSRT divider would be 4× as slow, and 4× larger than a 16-bit PSRT divider. Also, PSRT is well-suited for high Radix division such as Radix-64, since the Quotient Selection Table (QST) required by PSRT still increases slightly sub-linearly with Radix, versus quadratically with Radix as in other SRT implementations. The PSRT divider also leads to designs with low power consumption in part due to the area savings. The Spartan III implementation only consumed 5% of the resources of the low-cost $30 FPGA, and had a peak power consumption of 62.5 mW.

Exemplary computer code useful for performing the PSRT method on a computer system is attached hereto on a CDROM medium. Two identical copies of a PSRT Divider computer source code on two identical compact discs labeled "Copy 1" and "Copy 2" are incorporated by reference herein in their entirety. Each of the identical compact discs is IBM-PC compatible. Each of the identical compact discs includes the following files: File no. 1: File name: PSRT DIVIDER SOURCE CODE.doc; File size: 94 Kbytes; Date of file creation: Apr. 29, 2009, readable using Microsoft Word. File no. 2: File name: PSRT DIVIDER SOURCE CODE.txt; File size: 20 Kbytes; Date of file creation: Apr. 29, 2009, readable using any ASCII compatible program, such as Microsoft Windows Notepad or Microsoft Word.

The PSRT system and method represents a compromise between traditional SRT and quadratic convergence algorithms. It is contemplated that PSRT implementations using design optimization techniques such as pipelining, and carry-save adders, can be made comparable in speed and efficiency to quadratic convergence algorithms for lower operand widths. However, PSRT performs better in terms of both speed and area than traditional SRT algorithms. While the relative simplicity and alternative approximation scheme of the PSRT method and system results in a low-area design, with relatively low power, and low latency compared to SRT, multiplicative algorithms such as Taylor-series expansion can alternatively be used with some advantage for dividers with long operand widths where speed, as opposed to area and power consumption, are among the top design priorities.

The PSRT can be implemented using a program storage device readable by a machine, tangibly embodying a program of instructions executable by a specific semiconductor-based computational device situated in the machine to perform the steps of a partial SRT (PSRT) division of a dividend X by a divisor D to obtain a quotient Q. The program storage device can be the memory of a computer, a removable program storage device such as a magnetic disk or CD-ROM, a memory accessible over a communication systems such as the internet, or even paper tape or cards punched with holes (e.g., Hollerith or "IBM" cards such as are described in U.S. Pat. No. 395,782). The semiconductor-based computational device can be any conventional microprocessor, FPGA or other semiconductor-based device capable of performing the computational steps described hereinabove.

Many functions of electronic computer apparatus can be implemented in hardware (for example, hard-wired logic or other integrated circuitry), in software (for example, using instructions encoded in a program operating on a general purpose processor or on a specially designed processor), and in firmware (for example, using instructions encoded in a non-volatile memory that is accessed for operation on a processor as required). The present invention contemplates the substitution of one implementation of hardware, firmware and/or software for another implementation of the equivalent functionality using a different one of hardware, firmware and/or software. To the extent that an implementation can be represented mathematically by a mathematical function, that is, a specified response is generated at one or more output terminals for a specific input or inputs applied to one or more input terminals of a "black box" exhibiting the mathematical function, any implementation of the mathematical function, including any combination of hardware, firmware and/or software implementations of portions or segments of the mathematical function, is contemplated herein.

Recording the results from a PSRT operation, such as, for example, recording results of the division or multiplication of two numbers is understood to mean and defined herein as "writing" output data to a storage element or device. For example, recording the data of the division or multiplication of two numbers for later use as output or as data for display to a user can include, but is not limited to, writing data to random access memory ("RAM") (volatile or non-volatile), SRAM, DRAM, and EEPROM. Such digital memory elements or chips can be standalone memory devices, or can be incorporated within a programmable array, such as a field programmable array ("FPGA"), or within a microcomputer. "Writing output data" is defined herein as including writing transformed data to registers within a microcomputer. Memory elements or devices can also include other writing means, such as writing digital data to a magnetic storage device, such as a hard drive, magnetic technology disc, or other disc media, such as an optical CD media, or DVD media.

"Microcomputer" is defined herein as synonymous with microprocessor, microcontroller, and digital signal processor ("DSP"). It is understood that memory used by the microcomputer, including for example an algorithm to perform a PSRT operation can be coded as "firmware" that can reside in memory physically inside of a microcomputer chip or in memory external to the microcomputer or in a combination of internal and external memory. It is also understood that field programmable array ("FPGA") chips or application specific integrated circuits ("ASIC") chips can perform microcomputer functions, either in hardware logic, software emulation of a microcomputer, or by a combination of the two. Apparatus having any of the inventive features described herein can operate entirely on one microcomputer or can include more than one microcomputer.

Simulation Screenshots

Figure 21:
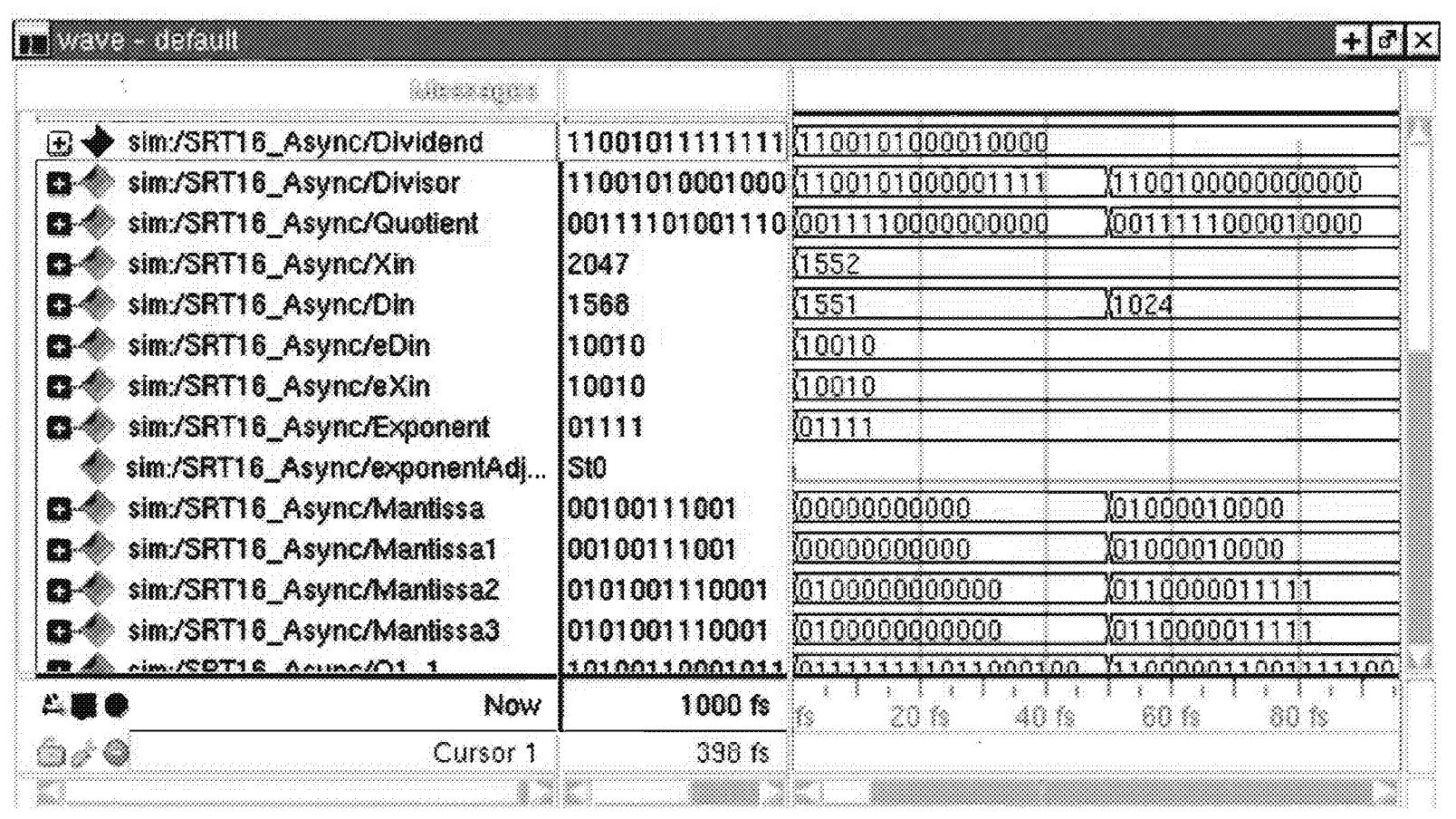

Modelsim® screenshots were recorded for some of the verification test conducted on the 16-bit floating point PSRT divider. FIG. 21 shows an exemplary Modelsim® wave window. Signals are to the left, and the bus data is shown to the right.

Figures 22, 23, 24:
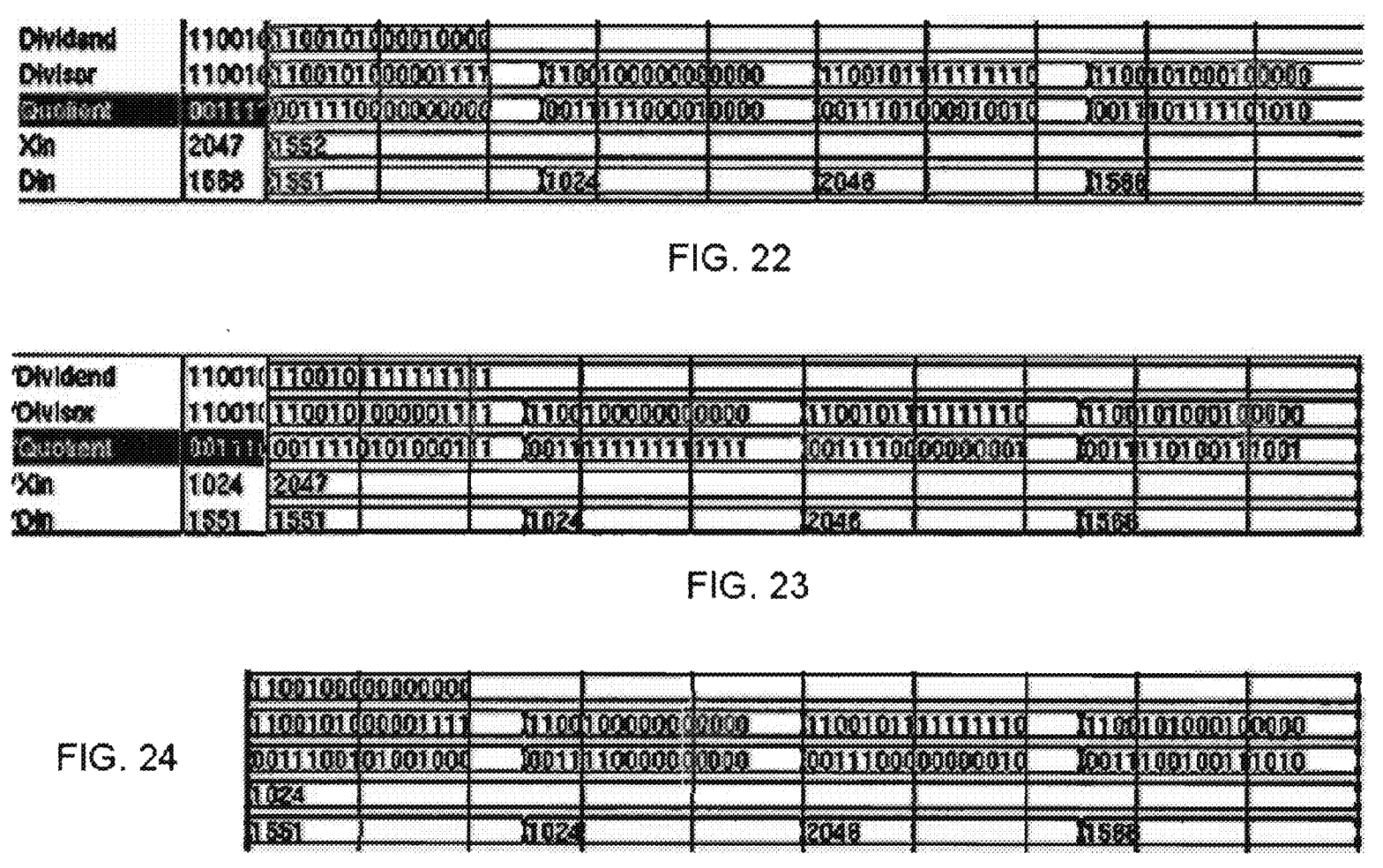

In FIG. 22, Modelsim® screenshot demonstrating average cases, the mantissa for the divided was 1.51563. The divisor's mantissa is listed from left to right. The divisors mantissa took on the values 1.51465, 1.00, 1.9902, and 1.28125. Xin is the value of the dividend's mantissa multiplied by $2^{10}$. Similarly, Din is the value of the divisor's mantissa multiplied by $2^{10}$. The results mantissa were 1.00000, 1.51563, 0.758789, and 0.989258, which are equivalent to the precise results 1.00064, 1.51563, 0.758553, and 0.989796 by one unit in the last place (1 ULP) which is equal to 0.000977 base 2, if the quotient is greater than or equal to 1, or 0.000488 is the quotient is less than 1. The actual answers were calculated by first multiplying the mantissas of the dividend and divisor by $2^{10}$, dividing the dividend by the divisor, then multiplying the quotient by $2^{-10}$.

FIG. 23, a Modelsim® screenshot demonstrates a worst case scenario, what occurs when the dividend is at its maximum value, and the divisor is at its minimum value. When the mantissa of the dividend is 2047e-10, and the mantissa of the divisor is 1024e-10, the result is 2046e-10, which is correct. In decimal, this is equivalent to 1.9902/1=1.9902, or all 1 s in the mantissa. In a second worst case, the dividend and divisor differ by 1ULP. The mantissa of the dividend is 2047e-10, and the divisor's mantissa is 2046e-10. The result is 1025e10 which is also correct. 1025e-10 is equivalent to 1.00098 base 10.

FIG. 24 demonstrates what occurs when the dividend and divisor are equal. In this case, the mantissas for both the dividend and divisor is 1024e-10, or 1.00. The mantissa of the quotient is 1024e10, or 1.00 which is correct.

Theoretical Analysis

Although the theoretical description, including proofs, given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

While the present invention has been particularly shown and described with reference to the structure and methods disclosed herein and as illustrated in the drawings, it is not confined to the details set forth and this invention is intended to cover any modifications and changes as may come within the scope and spirit of the following claims.

What is claimed is:

1. A non-transitory programmable storage device readable by a machine, tangibly embodying a program of instructions executable by a specific semiconductor-based computational device situated in the machine to perform the method steps of a partial SRT (PSRT) division of a dividend X by a divisor D to obtain a quotient Q, said method steps comprising:

causing a computer to obtain said dividend X and said divisor D;

representing said dividend X and said divisor D as a digital representation having a plurality of bits; and performing iteratively the following steps until a desired accuracy of said quotient Q is achieved:

entering said divisor into a partial quotient select table (PQST), said PQST configured to output an inverse of said divisor 1/X' to n+3 most significant digits, wherein n equals $\log_b R$, b equals a number of the base system, and R equals a Radix, said PQST having a ROM size given by $[2^{(n+2)} \times (n+2)]$ for b=2, and having a ROM size given by $[2^{(n+3)} \times (n+3)]$ for all other values of b;

multiplying said 1/X' by a selected one P' selected from:
1) on a first iteration: X, and
2) on a successive iteration: a partial remainder P from a previous cycle to compute as output a Q';

truncating said Q' to n most significant bits to yield a quotient Q";

multiplying Q" by said divisor D and subtracting the resultant Q" D from P' to compute said partial remainder P;

shifting said partial remainder P and said quotient Q" by n digits; and comparing said most recent Q" to a previously computed Q" to determine whether said desired accuracy has been achieved;

in the event that said desired accuracy has been achieved, performing a selected step of recording, outputting and displaying said quotient Q=said most recent Q" in a digital form; and in the event that said desired accuracy has not been achieved, performing the steps identified above as iterative steps again until said desired accuracy has been achieved and a selected step of recording, outputting and displaying said quotient Q=said most recent Q" in a digital form is performed.

2. The programmable storage device of claim 1, wherein at least one calculation of one of said method steps is performed using a synchronous hardware logic element.

3. The programmable storage of claim 2, wherein at least one of said synchronous hardware logic elements is clocked on a positive edge of a clock and at least one of said synchronous hardware logic elements is clocked on a negative edge of said clock.

4. The programmable storage of claim 2, wherein at least one of said synchronous hardware logic elements is clocked on both a positive edge of a clock and a negative edge of said clock.

5. The programmable storage of claim 4, wherein at least one of said synchronous hardware logic elements is configured to provide said partial remainder on a clock edge of a first slope so that as said partial remainder is available to calculate a next quotient bit on a successive clock edge complimentary to said first slope.

6. The programmable storage device of claim 1, wherein at least one calculation of one of said method steps is performed using an asynchronous hardware logic element.

7. The programmable storage device of claim 6, wherein a two stage asynchronous divider multiplies 1/X' by said partial remainder.

8. The programmable storage device of claim 1, wherein said method steps are performed using a linear convergence algorithm.

9. The programmable storage of claim 8, wherein said linear convergence algorithm converges a digit precision of said quotient to a pre-determined number of bits.

10. The programmable storage of claim 1, wherein said step of entering said divisor into a partial quotient select table (PQST) comprises entering said divisor into a partial quotient select table (PQST) having entries of size n+3 bits and a following step of multiplying uses a n+3-bit multiplier.

11. The programmable storage of claim 1, wherein said divisor complies with the IEEE-754r standard.

12. The programmable storage device of claim 1, wherein said semiconductor-based computational device is an FPGA (field programmable logic array).

13. The programmable storage device of claim 1, wherein said semiconductor-based computational device is a microprocessor.

14. The programmable storage device of claim 13, wherein said PQST is disposed in a look up table on said microprocessor.

15. The programmable storage device of claim 13, wherein said PQST is calculated by software and stored on memory accessible by said microprocessor.

16. The programmable storage device of claim 1, wherein said PQST is calculated according to the following equation:

$$PQST[j]=b^{n+2}/a \text{ for } a=b^{n+3} \text{ to } b^{n+4}-1, \text{ and } j=a-b^{n+3}.$$

17. An article of manufacture comprising:
a non-transitory computer usable medium having computer readable program code embodied therein in a non-transitory manner for causing a partial SRT (PSRT) division of a dividend X by a divisor D to generate a quotient Q, the computer readable program code in said article of manufacture comprising:
computer readable program code for causing a computer to obtain said dividend X and said divisor D and to represent said dividend X and said divisor D as a digital representation having a plurality of bits; and
computer readable program code configured to cause a computer to iteratively perform the following calculations until a desired accuracy of said quotient Q is achieved:
computer readable program code configured to cause a computer to obtain said dividend X and said divisor D, and to enter said divisor D into a partial quotient select table (PQST), said PQST configured to output an inverse 1/X' of said divisor to n+3 digits, wherein n equals $\log_b R$, b equals a number of the base system, and R equals a Radix, said PQST having a ROM size given by $[2^{(n+2)} \times (n+2)]$ for b=2, and having a ROM size given by $[2^{(n+3)} \times (n+3)]$ for all other values of b;
computer readable program code configured to cause said 1/X' to be multiplied by a selected one P' of:
1) on a first iteration: X, and
2) on a successive iteration: a partial remainder P from a previous iteration to compute as output a Q';
computer readable program code configured to cause said Q' to be truncated to n most significant bits to yield a quotient Q";
computer readable program code configured to cause said quotient Q" to be multiplied by said divisor to produce a partial product Q" D;
computer readable program code configured to cause said partial product Q" D to be subtracted from P' to compute said partial remainder P;
computer readable program code configured to cause said partial remainder P and said quotient Q" to be shifted by n digits; and
comparing said most recent Q" to a previously computed Q" to determine whether said desired accuracy has been achieved:
in the event that said desired accuracy has been achieved, performing a selected step of recording, outputting and displaying said quotient Q=said most recent Q" in a digital form; and
in the event that said desired accuracy has not been achieved, performing the steps identified above as iterative steps again until said desired accuracy has been achieved and a selected step of recording, outputting and displaying said quotient Q=said most recent Q" in a digital form is performed.

18. A microprocessor-based computational device, comprising:
an input port and an output port in communication with a logic unit, said logic unit configured to control a memory, a multiplier, an adder/subtractor, a truncation register, a shift register, and a comparator;
said input port configured to accept a dividend X and a divisor D, said dividend X and said divisor D each having a digital representation having a plurality of bits;
said output port configured to provide as output a quotient Q representing X/D to a desired accuracy;
said memory configured to hold a partial quotient select table (PQST), said PQST configured to output an inverse of said divisor 1/X' to n+3 most significant digits, wherein n equals $\log_b R$, b equals a number of the base system, and R equals a Radix in response to receipt of said divisor D, said PQST having a ROM size given by $[2^{(n+2)} \times (n+2)]$ for b=2, and having a ROM size given by $[2^{(n+3)} \times (n+3)]$ for all other values of b;
said multiplier configured to multiply said 1/X' by a selected one P' selected from: on a first iteration: X, and on a successive iteration: a partial remainder P from a previous cycle to compute as output a Q';

said truncation register configured to truncate said Q' to n most significant bits to yield a quotient Q";

said multiplier configured to multiply Q" by said divisor D to provide a resultant Q" D;

said adder/subtractor configured to subtract the resultant Q" D from P' to compute said partial remainder P;

said shift register configured to shift said partial remainder P and said quotient Q" by n digits;

said comparator configured to compare said most recent Q" to a previously computed Q" to determine whether said desired accuracy has been achieved: and said logic unit configured to control the operation of the microprocessor-based computational device to cause it to perform a selected one of:

- in the event that said desired accuracy has been achieved, terminating said calculation and causing said quotient Q=said most recent Q" to be output from said output port in a digital form; and
- in the event that said desired accuracy has not been achieved, causing the performance of repeated iterative cycles of calculation until said desired accuracy has been achieved, and then terminating said calculation and causing said quotient Q=said most recent Q" to be output from said output port in a digital form.

* * * * *